(12) United States Patent
Usami

(10) Patent No.: US 8,205,054 B2
(45) Date of Patent: Jun. 19, 2012

(54) HIERARCHICAL STORAGE SYSTEM

(75) Inventor: Kazuhiro Usami, Odawara (JP)

(73) Assignees: Hitachi, Ltd., Tokyo (JP); Hitachi Computer Peripherals Co., Ltd., Kanagawa-ken (JP)

( * ) Notice: Subject to any disclaimer, the term of this patent is extended or adjusted under 35 U.S.C. 154(b) by 716 days.

(21) Appl. No.: 12/351,339

(22) Filed: Jan. 9, 2009

(65) Prior Publication Data

US 2010/0115222 A1 May 6, 2010

(30) Foreign Application Priority Data

Oct. 31, 2008 (JP) ................................. 2008-281120

(51) Int. Cl.
*G06F 12/02* (2006.01)
(52) U.S. Cl. ......... 711/165; 711/117; 711/111; 711/170
(58) Field of Classification Search .................. None
See application file for complete search history.

(56) References Cited

U.S. PATENT DOCUMENTS

| | | | | |
|---|---|---|---|---|
| 6,032,224 | A * | 2/2000 | Blumenau ..................... | 711/117 |
| 2003/0065898 | A1* | 4/2003 | Flamma et al. ............... | 711/165 |
| 2004/0268070 | A1* | 12/2004 | Hasegawa ..................... | 711/162 |
| 2007/0079099 | A1 | 4/2007 | Eguchi | |
| 2007/0239954 | A1 | 10/2007 | Sakashita et al. | |
| 2008/0082778 | A1 | 4/2008 | Inoue et al. | |
| 2008/0086616 | A1 | 4/2008 | Asano et al. | |
| 2008/0104350 | A1 | 5/2008 | Shimizu et al. | |

FOREIGN PATENT DOCUMENTS

| | | |
|---|---|---|
| JP | 2007-102455 | 4/2007 |
| JP | 2007-280089 | 10/2007 |
| JP | 2008-90741 | 4/2008 |
| JP | 200884053 | 4/2008 |
| JP | 2008112276 | 5/2008 |

OTHER PUBLICATIONS

Japanese Office Action dated Oct. 26, 2010, issued in corresponding Japanese Patent Application No. 2008-281120.

\* cited by examiner

*Primary Examiner* — Sanjiv Shah
*Assistant Examiner* — Daniel Tsui
(74) *Attorney, Agent, or Firm* — Brundidge & Stanger, P.C.

(57) ABSTRACT

Pools of a plurality of types of storage devices are configured and are included in different layers. Based on at least one storage device of the same type, the pools of types corresponding to the type are configured. The controller in the storage system carries out storage location change processing in which the storage location of targeted data that has been stored into the targeted first real page allocated to a virtual page in a virtual volume is changed to the second real page that has not been allocated in a pool of the second type different from a pool of the first type including the targeted first real page in the case in which the controller conforms to the prescribed storage location change conditions. A size of a real page is different depending on a type of a pool.

12 Claims, 21 Drawing Sheets

FIG. 10

VIRTUAL VOL CONTROL TABLE 61

| VIRTUAL VOL | | REAL PAGE OF AN ALLOCATING SOURCE | | |
|---|---|---|---|---|
| VIRTUAL VOL ID | LBA | POOL ID | POOL TYPE | PAGE NUMBER |
| VIRTUAL VOL 1 | LBA0 (0000 ~ 0099) | POOL 1 | FC-HDD (15K) POOL | 0 |
| | LBA1 (0100 ~ 0199) | | | 1 |
| | LBA2 (0200 ~ 0299) | | | 2 |
| | LBA3 (0300 ~ 0399) | | | 3 |
| | LBA4 (0400 ~ 0499) | POOL 2 | SATA-HDD POOL | 0 |
| | LBA5 (0500 ~ 0599) | | | 0 |
| | LBA6 (0600 ~ 0699) | | | 4 |
| | LBA7 (0700 ~ 0799) | | | 4 |
| | LBA8 (0800 ~ 0899) | POOL 1 | FC-HDD (15K) POOL | 4 |
| | LBA9 (0900 ~ 0999) | | | 5 |
| | LBA10 (1000~1099) | POOL 3 | TAPE POOL | 0 |
| | LBA11 (1100~1199) | | | 0 |
| | LBA12 (1200~1299) | | | 0 |
| | LBA13 (1300~1399) | | | 0 |
| | : | : | : | : |
| VIRTUAL VOL 2 | LBA0 (0000 ~ 0099) | POOL 4 | FC-HDD (10K) POOL | 0 |
| | : | : | : | : |

611　612　613　614　615

FIG. 11
POOL CONTROL TABLE 62

| 621 | 622 | 623 | 624 | 625 | 626 | 627 |
|---|---|---|---|---|---|---|
| POOL ID | POOL TYPE | POOL VOLUME | REAL PAGE SIZE | TOTAL NUMBER OF REAL PAGES | NUMBER OF USED REAL PAGES | NUMBER OF EMPTY REAL PAGES |
| POOL 1 | FC-HDD POOL | 1000TB | 16MB | $60 \times 10^6$ | X1 | Y1 |
| POOL 2 | SATA-HDD POOL | 1000TB | 32MB | $30 \times 10^6$ | X2 | Y2 |
| POOL 3 | TAPE POOL | 1TB | 64MB | $15 \times 10^3$ | X3 | Y3 |
| POOL 4 | FC-HDD POOL | 500TB | 16MB | $30 \times 10^6$ | X4 | Y4 |
| POOL 5 | SATA-HDD POOL | 800TB | 32MB | $25 \times 10^6$ | X5 | Y5 |
| POOL 6 | EXTERNAL STORAGE POOL | 10TB | 64MB | $15 \times 10^4$ | X6 | Y6 |
| .. | | | | | | .. |

| 628 | 629 | 62A | 62B | 62C |
|---|---|---|---|---|
| USED REAL PAGE QUEUE POINTER | EMPTY REAL PAGE QUEUE POINTER | DATA CREATED DATE AND TIME QUEUE POINTER | FINAL DATA UPDATE DATE AND TIME QUEUE POINTER | FINAL DATA ACCESS DATE AND TIME QUEUE POINTER |
| A1 | B1 | C1 | D1 | E1 |
| A2 | B2 | C2 | D2 | E2 |
| A3 | B3 | C3 | D3 | E3 |
| A4 | B4 | C4 | D4 | E4 |
| A5 | B5 | C5 | D5 | E5 |
| A6 | B6 | C6 | D6 | E6 |
| .. | | | | .. |

FIG. 12

REAL PAGE CONTROL TABLE 63

| PAGE NUMBER | REAL PAGE SIZE | VIRTUAL PAGE OF AN ALLOCATED LOCATION | | DATA CHARACTERISTICS | | | |
|---|---|---|---|---|---|---|---|
| | | VIRTUAL VOL ID | LBA | DATA CREATED DATE AND TIME | FINAL DATA UPDATE DATE AND TIME | FINAL DATA ACCESS DATE AND TIME | NUMBER OF ACCESSES |
| 100 | 16MB | VIRTUAL VOL1 | LBA0 | 08/01/01 01:23:45 | 08/05/05 01:23:45 | 08/08/08 01:23:45 | F1 |
| 101 | 16MB | VIRTUAL VOL2 | LBA0 | 08/02/02 01:23:45 | 08/02/02 01:23:45 | 08/09/09 01:23:45 | F2 |
| 102 | 16MB | VIRTUAL VOL2 | LBA5 | 08/03/03 01:23:45 | 08/07/07 01:23:45 | 08/07/07 01:23:45 | F3 |
| .. | | | | .. | .. | .. | .. |

631, 632, 633, 634

| QUEUE POINTER IN A POOL | DATA CREATED DATE AND TIME QUEUE POINTER | FINAL DATA UPDATE DATE AND TIME QUEUE POINTER | FINAL DATA ACCESS DATE AND TIME QUEUE POINTER |
|---|---|---|---|
| G1 | H1 | I1 | J1 |
| G2 | H2 | I2 | J2 |
| G3 | H3 | I3 | J3 |
| .. | .. | .. | .. |

LAYER CHANGE RULE TABLE 64

| TARGETED POOL 641 | | RULE TYPE 642 | LAYER CHANGE RULE 643 | | POOL OF THE CHANGED DESTINATION 644 | |
|---|---|---|---|---|---|---|
| POOL ID 6411 | POOL TYPE 6412 | | JUDGMENT ITEM 6431 | CONDITION 6432 | POOL ID 6441 | POOL TYPE 6442 |
| POOL 1 | FC-HDD POOL | LAYER DOWN RULE | DATA CREATED DATE AND TIME | 30 DAYS ELAPSE | POOL 2 | SATA-HDD POOL |
| POOL 4 | FC-HDD POOL | LAYER DOWN RULE | FINAL DATA UPDATE DATE AND TIME | 7 DAYS ELAPSE | POOL 5 | SATA-HDD POOL |
| POOL 2 | SATA-HDD POOL | LAYER DOWN RULE | DATA CREATED DATE AND TIME | 365 DAYS ELAPSE | POOL 3 | TAPE POOL |
| POOL 2 | SATA-HDD POOL | LAYER UP RULE | NUMBER OF ACCESSES | EXCEEDS 10000 TIMES | POOL 1 | FC-HDD POOL |
| POOL 5 | SATA-HDD POOL | LAYER DOWN RULE | FINAL DATA UPDATE DATE AND TIME | 30 DAYS ELAPSE | POOL 6 | EXTERNAL STORAGE POOL |
| POOL 5 | SATA-HDD POOL | LAYER UP RULE | NUMBER OF ACCESSES | EXCEEDS 10000 TIMES | POOL 4 | FC-HDD POOL |
| POOL 3 | TAPE POOL | LAYER UP RULE | NUMBER OF ACCESSES | EXCEEDS 100 TIMES | POOL 2 | SATA-HDD POOL |
| .. | | .. | .. | .. | .. | .. |

FIG. 19

POOL DEFINITION WINDOW — 71

POOL ID: [10]   PAGE SIZE: ○16MB  ●64MB  ○256MB — 72

ALLOCATED STORAGE  TOTAL VOLUME: 2000  TOTAL NUMBER OF PAGES: 128000 PAGES — 73

| RAID GROUP NUMBER | START BLOCK NUMBER | END BLOCK NUMBER |
|---|---|---|
| 0 | 0 | 29999 |
| 1 | 0 | 29999 |
| 2 | 10000 | 19999 |
| 3 | 10000 | 19999 |

RAID GROUP NUMBER [0]
START BLOCK NUMBER [0]
END BLOCK NUMBER [29999]

[ADD]   [DELETE]

LAYER CHANGE RULE — 74

LAYER DOWN

☑ DATA CREATED DATE AND TIME    [365] DAYS ELAPSE    NUMBER OF POOL OF CHANGED LOCATION [5]
☐ FINAL DATA UPDATE DATE AND TIME    [   ] DAYS ELAPSE
☑ FINAL DATA ACCESS DATE AND TIME    [30] DAYS ELAPSE    [20]

LAYER UP

☑ NUMBER OF ACCESSES  EXCEEDS  [1000] TIMES    [3]

[OK]   [CANCEL]

HIERARCHICAL STORAGE SYSTEM

CROSS-REFERENCE TO PRIOR APPLICATION

This application relates to and claims the benefit of priority from Japanese Patent Application number 2008-281120, filed on Oct. 31, 2008 the entire disclosure of which is incorporated herein by reference.

BACKGROUND

The present invention relates to a storage system provided with storage devices of a plurality of types having different performances.

Conventionally, a hierarchical storage system has been known. The hierarchical storage system is provided with storage devices of a plurality of types having different performances, and can carry out a data management by using a plurality of layers in the case in which an aggregation of storage areas on the storage devices of the same type is a layer. For instance, the hierarchical storage system can decide a layer that is a data storage location based on the characteristics of the data (such as a frequency of an access). The hierarchical storage system can carry out an efficient data management by storing data to a layer suitable for the characteristics of the data. Patent Citations 1 to 3 disclose the techniques related to the hierarchical storage system.

[Patent Citation 1]
Japanese Patent Application Laid-Open Publication No. 2007-102455
[Patent document 2]
Japanese Patent Application Laid-Open Publication No. 2007-280089
[Patent document 3]
Japanese Patent Application Laid-Open Publication No. 2008-90741

In the case in which the data characteristics that decide a data storage location vary as time goes on, the hierarchical storage system can change a layer of a data storage location by carrying out a migration of data. As a method for changing a layer, a method for carrying out in a unit of a logical volume (hereafter referred to as a volume unit change method) and a method for carrying out in a unit of a file (hereafter referred to as a file unit change method) are known.

For the volume unit change method, it is judged whether the data characteristics of data in the logical volume conform to the prescribed conditions or not for every logical volume. In the case in which the data characteristics of data in the logical volume conform to the prescribed conditions, all data in the logical volume are migrated to a logical volume in a layer different from the logical volume.

The volume unit change method is disadvantageous in that a unit of data to be migrated is too large. The too large unit of data is disadvantageous by the following reasons.

That is, data that has been stored into a logical volume (hereafter referred to as volume data) is an aggregation of a plurality of data that has been stored into each of a plurality of data blocks that configure the logical volume (hereafter referred to as block data). The data characteristics of the block data differ from each other for every block data. Consequently, the data characteristics can be variable for one volume data in some cases. In this case, the volume data that has been migrated includes block data to be changed to a layer that conforms to the data characteristics and block data to be changed to a layer that does not conform to the data characteristics. As a data unit is larger, the number of block data to be changed to a layer that does not conform to the data characteristics is more likely to be larger. More specifically, as a data unit is larger, it is difficult to change to a suitable layer that conforms to the data characteristics.

On the other hand, for the file unit change method, it is judged whether the data characteristics of data that configures the file conform to the prescribed conditions or not for every file. In the case in which the data characteristics conform to the prescribed conditions, data that configures the file is migrated to a storage location in a layer different from a storage location that has stored the data.

For the file unit change method, the above described problems in the volume unit change method do not occur. This is because data characteristics related to data that configures a file are the characteristics of the file by ordinary, and the data characteristics are not varied for data that configures a file.

However, the file unit change method is disadvantageous in that the processing for changing a layer requires a great deal of time. This is because the processing that is carried out by a file system that manages a file (such as a retrieval of a directory) requires a great deal of time.

SUMMARY

An object of the present invention is to store data into a suitable layer that conforms to the data characteristics without increasing a processing load.

Other objects of the present invention will be clarified by the explanation described later.

The storage system is provided with a plurality of storage devices that are the basis of pools of a plurality of types and a controller that receives an I/O request that is a write request or a read request from a host computer and that carries out an I/O processing that follows the I/O request. The plurality of storage devices includes storage devices of a plurality of types having different performances. The pools of a plurality of types are included in different layers. Based on at least one storage device of the same type, pools of types corresponding to the type are configured. The pools of every type are configured by a plurality of real pages based on at least one storage device of the same type that is the basis of a pool. The controller includes an I/O processing section and a storage location change processing section. In the case in which the I/O processing section receives a write request in which a virtual page in a virtual volume that is a virtual logical volume composed of a plurality of virtual pages is specified from the host computer, the I/O processing section allocates a real page that has not been allocated in a pool of any one of types to the virtual page and writes the write targeted data that follows the received write request to the allocated real page if the real page has not been allocated to the specified virtual page as the I/O processing. In the case in which the storage location change processing section conforms to the prescribed storage location change conditions, the storage location change processing section carries out the storage location change processing in which the storage location of targeted data that has been stored into the targeted first real page allocated to a virtual page is changed to the second real page that has not been allocated in a pool of the second type different from a pool of the first type including the targeted first real page. Each virtual page is a virtual storage area. Each real page is a physical storage area. A size of a real page is different depending on a type of a pool.

At least one of the above described I/O processing sections and at least one of the above described storage location change processing sections can be established by hardware and computer programs or a combination thereof (for instance, a part is implemented by computer programs and the other part is implemented by hardware). The computer programs are executed by being read in the prescribed processor. In the information processing that is carried out by reading the computer programs in the processor, a storage area that exists on a hardware resource such as a memory can also be used as needed. The computer programs can be installed to a computer from a recording medium such as a CD-ROM, and can be downloaded to a computer via a communication network.

BRIEF DESCRIPTION OF THE DRAWINGS

FIG. 10 is a view for showing an example of a virtual VOL control table.

FIG. 11 is a view for showing an example of a pool control table.

FIG. 12 is a view for showing an example of a real page control table.

FIG. 13 is a view for showing an example of a layer change rule table.

FIG. 19 is a view for showing an example of a window in which CLT makes a user to set the information related to a pool.

DETAILED DESCRIPTION OF THE PREFERRED EMBODIMENT

An embodiment of the present invention will be described below in detail with reference to the drawings.

Figure 1:
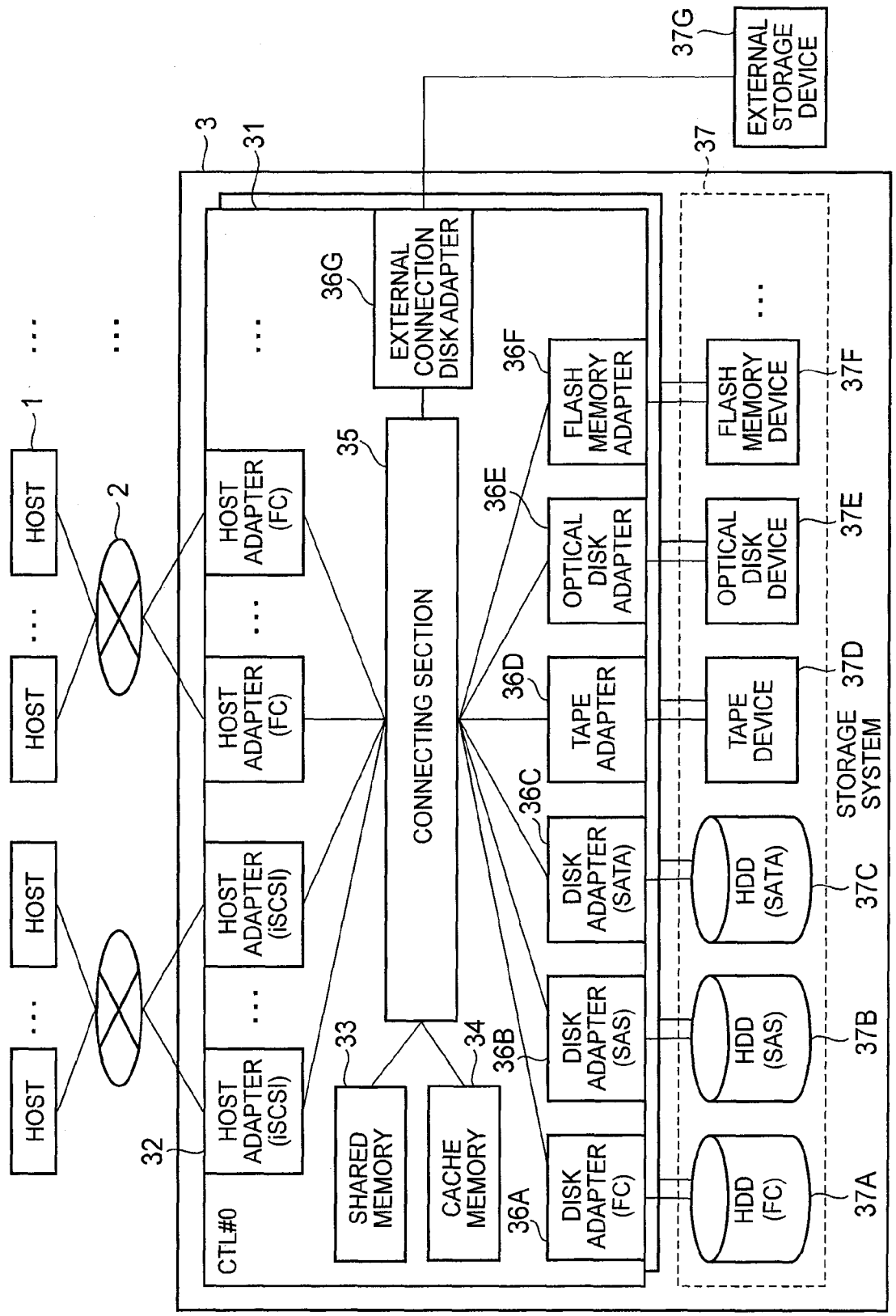
FIG. 1 is a view for showing a configuration example of a computer system in accordance with an embodiment of the present invention.

FIG. 1 shows a configuration example of a computer system in accordance with an embodiment of the present invention.

A host computer (hereafter simply referred to as a host) 1 and a storage system 3 are connected to each other via a communication network 2. A data communication between the host 1 and the storage system 3 is carried out based on a protocol such as an iSCSI (Internet Small Computer System Interface) protocol and a FC (Fibre Channel) protocol.

The storage system 3 is provided with a multiplexed controller device (CTL) 31 and storage devices 37 of a plurality of types having different performances for instance.

The CTL 31 is a hardware circuit for instance. The CTL 31 is provided with a host adapter 32, a shared memory 33, a cache memory 34, a connecting section 35, and a storage device adapter 36.

The host adapter 32 is an interface device for carrying out a data communication with an external device such as the host 1 and other storage system 3, and is provided with one or a plurality of communication ports. The host adapter 32 is configured as a microcomputer system provided with devices such as a CPU and a memory (for instance, a circuit board). In the case in which the host adapter 32 receives a write request from the host 1 for instance, the host adapter 32 writes the write targeted data to the cache memory 34, and writes a command received from the host 1 to the shared memory 33. Moreover, in the case in which the host adapter 32 receives a read request from the host 1, the host adapter 32 writes a command received from the host 1 to the shared memory 33, and reads the read targeted data that has been read from a storage device 37 by the storage device adapter 36 and that has been written to the cache memory 34 from the cache memory 34 to transmit the data to the host 1.

The storage device adapter 36 is an interface device for carrying out a data transmission and reception with a storage device 37. The storage system 3 is provided with storage device adapters 36 of a plurality of types for connecting to storage devices 37 of a plurality of types. Similarly to the host adapter 32, the storage device adapters 36 can be configured as a microcomputer system provided with devices such as a CPU and a memory. For instance, the storage device adapter 36 reads the write targeted data that has been written to the cache memory 34 from the host adapter 32 from the cache memory 34, and writes the data to the storage device 37. In addition, the storage device adapter 36 writes the read targeted data that has been read from the storage device 37 to the cache memory 34.

The connecting section 35 is a cross bar switch for instance, and is a device for connecting the host adapter 32, the shared memory 33, the cache memory 34, and the storage device adapter 36 to each other. A connection unit of other kinds such as a bus can also be adopted as the connecting section 35.

The shared memory 33 can be configured by a volatile or nonvolatile semiconductor memory for instance. The shared memory 33 stores commands of many kinds that have been received from the host 1 and control information that is used for controlling the storage system 3 for instance. The redundant storage of the commands and control information can also be carried out by a plurality of shared memories 33.

The cache memory 34 can be configured by a volatile or nonvolatile semiconductor memory for instance. The cache memory 34 stores the data that has been received from the host 1 and the data that has been read from the storage device 37 for instance. The shared memory 33 and the cache memory 34 can be configured as memories separate from each other as shown in the embodiment of the present invention, or can be configured as one memory. In the case in which the shared memory 33 and the cache memory 34 are configured as one memory, a part of the memory is used as a cache area and the other part of the same memory is used as a shared memory area.

A various types of the storage devices 37 can be thought depending on a difference in a storage medium (for instance, a hard disk, a flash memory, and a tape), a difference in a connecting system with the storage device adapter 36 (for instance, an FC system, a SAS (Serial Attached SCSI) system, and a SATA (Serial AT Attachment) system), and a difference in a rotation speed in the case in which a storage medium is a hard disk for instance. In the embodiment of the present invention, the following seven types are considered as a type of the storage device 37. The storage system 3 in accordance with the embodiment of the present invention is provided with the seven types of the storage devices 37. (To be exact, the storage system 3 in accordance with the embodiment of the present invention is provided with the storage devices 37 of the following (1) to (6), and can use the storage device 37 of the following (7).)

(1) FC-HDD 37A: the storage device 37 in which a storage medium is a hard disk (hard disk drive (HDD)) and in which a connecting system with the storage device adapter 36 is an FC system
(2) SAS-HDD 37B: the storage device 37 in which a storage medium is a hard disk (hard disk drive (HDD)) and in which a connecting system with the storage device adapter 36 is a SAS system
(3) SATA-HDD 37C: the storage device 37 in which a storage medium is a hard disk (hard disk drive (HDD)) and in which a connecting system with the storage device adapter 36 is a SATA system
(4) Tape device 37D: the storage device 37 in which a storage medium is a tape
(5) Optical disk device 37E: the storage device 37 in which a storage medium is an optical disk
(6) Flash memory device 37F: the storage device 37 in which a storage medium is a flash memory
(7) External storage device 37G: the storage device 37 included in an external storage system 3

The storage devices 37 of the seven types have an access performance different from each other. In the case in which the access performances thereof are compared with each other, the flash memory device 37F, the FC-HDD 37A, the SAS-HDD 37B, the SATA-HDD 37C, the optical disk device 37E, and the tape device 37D can be ranked in this descending order from a higher access performance. The tape device 37D is a sequential access device. Consequently, although an access speed performance of the tape device 37D is low, a data transfer speed performance of the tape device 37D is higher than that of a single HDD. Moreover, the external storage devices 37G are different in an access performance depending on a storage medium thereof and a connecting system between the storage systems 3 or the like. Consequently, the external storage device 37G is not compared with others here.

Figure 2:
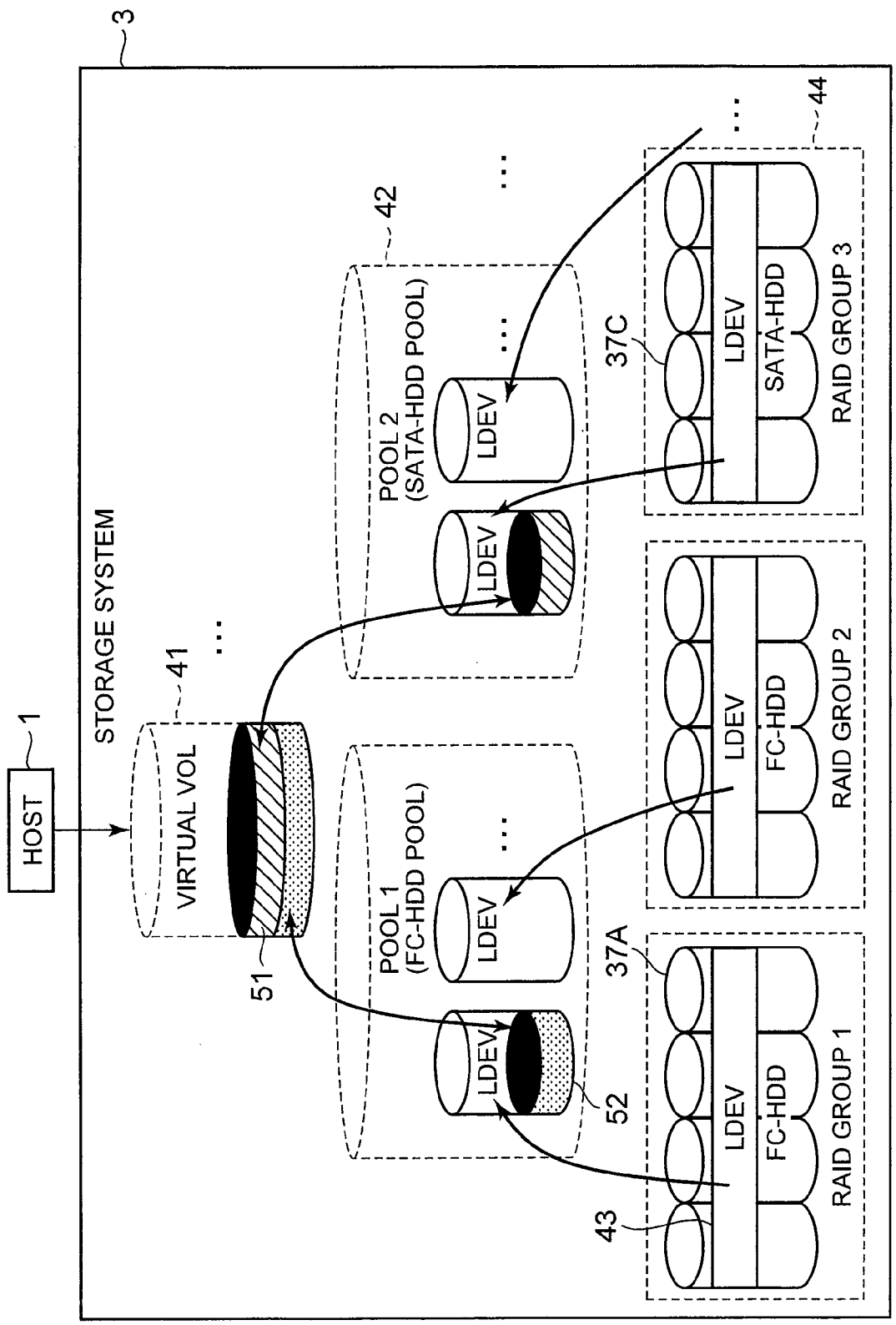
FIG. 2 is a view for showing a configuration example of a logical volume that is formed based on a storage device.

FIG. 2 is a view for showing a configuration example of a logical volume that is formed based on the storage device 37.

FIG. 2 illustrates an HDD (the FC-HDD 37A and the SATA-HDD 37C) as the storage device 37. Even in the case of other types of the storage devices 37, a logical volume is configured similarly to the case of the HDD.

For the storage system 3, at least one RAID (Redundant Arrays of Independent (or Inexpensive) Disks) group 44 is composed of a plurality of storage devices 37 of the same type for instance. The RAID group 44 provides a redundant storage system based on the prescribed RAID level such as RAID1 and RAID5. An LDEV (Logical Device) 43 is configured by parts of storage areas of a plurality of storage devices 37 included in the RAID group 44. More specifically, the LDEV 43 is a logical volume that is configured by a physical storage area (hereafter referred to as a real area) on the storage device 37.

A pool 42 is an area for registering a real area that can be allocated to a virtual VOL 41. A registration of a real area to the pool 42 is carried out by registering at least one LDEV 43 to the targeted pool 42. More specifically, a real area that configures the LDEV 43 registered to a pool 42 is a real area that has been registered to the pool 42 (a real area in the pool 42). The LDEV 43 of the same type (the LDEV 43 formed by a storage area on the storage device 37 of the same type) is registered to one pool 42. Consequently, a real area of the same type (a storage area on the storage device 37 of the same type) is registered to one pool 42. The storage system 3 is provided with the storage devices 37 of a plurality of types. Therefore, the LDEVs 43 of a plurality of types corresponding to a type the storage device 37 are formed, and the pools 42 of a plurality of types corresponding to a type the storage device 37 are formed. All of real areas of the same type are not registered to one pool 42. A plurality of the pools 42 of the same type can also be formed by registering the real areas of the same type to different pools 42.

The virtual VOL 41 is a logical volume that is supplied to the host 1, and is a logical volume that is configured by a virtual storage area (hereafter referred to as a virtual area). The virtual VOL 41 does not have a real area. Consequently, in the case in which a write request of data to the virtual VOL 41 is generated, a real area in the pool 42 is allocated to the virtual area, and the write targeted data is stored into the allocated real area. An allocation of a real area to the virtual area is carried out in a unit of a prescribed size. The allocation unit is called "page" in the following descriptions as a matter of practical convenience. Moreover, an allocation unit of the virtual area that is an allocated side (an allocated location) is called "virtual page", and an allocation unit of the real area that is an allocating side (an allocating source) is called "real page".

From the above descriptions, the following description can also be done. The virtual VOL 41 is a logical volume that is configured by a plurality of virtual pages 51. The pool 42 is configured by at least one LDEV 43 of the same type, and therefore is one real page group that is configured by a plurality of real pages 52 of the same type.

The sizes of the real pages 52 are different from each other depending on a type of the pool 42 in some cases, which will be described later. The size of the virtual page 51 and the size of the real page 52 are different from each other in some cases. The host 1 can read or write data to the virtual page 51 in the virtual VOL 41 by specifying an address that specifies the virtual page 51 (LBA (Logical Block Address)) and by transmitting a write request or a read request.

A write processing of data to the virtual VOL 41 will be simply described in the following. That is, a CTL 31 that has received a write request judges whether a real page 52 in a pool 42 has been already allocated to the virtual page 51 in an LBA specified by the write request or not. In the case in which the real page 52 has not been allocated, the CTL 31 decides a real page 52 in a pool 42 in a plurality of pools 42 that is allocated to the virtual page 51. The pool 42 that includes the real page 52 to be allocated the virtual page 51 can be set in advance for every virtual VOL 41, and can be automatically decided corresponding to the data characteristics of the write targeted data that has been judged by the CTL 31 for instance. After that, the CTL 31 allocates the real page 52 that has not been allocated to any virtual page 51 among the real pages 52 in the decided pool 42 (that is, the real page 52 that has not been allocated) to the specified virtual page 51. After that, the CTL 31 stores the write targeted data into the real page 52 that has been allocated to the specified virtual page 51.

The subject that carries out a write processing of data is the CTL 31 here. However, more precisely, the processing is carried out by a CPU of the host adapter 32 (or the storage device adapter 36) executing the computer programs. Other processing that is mainly carried out by the CTL 31 (such as a layer change processing described later) is also similar to the above.

Figure 3:
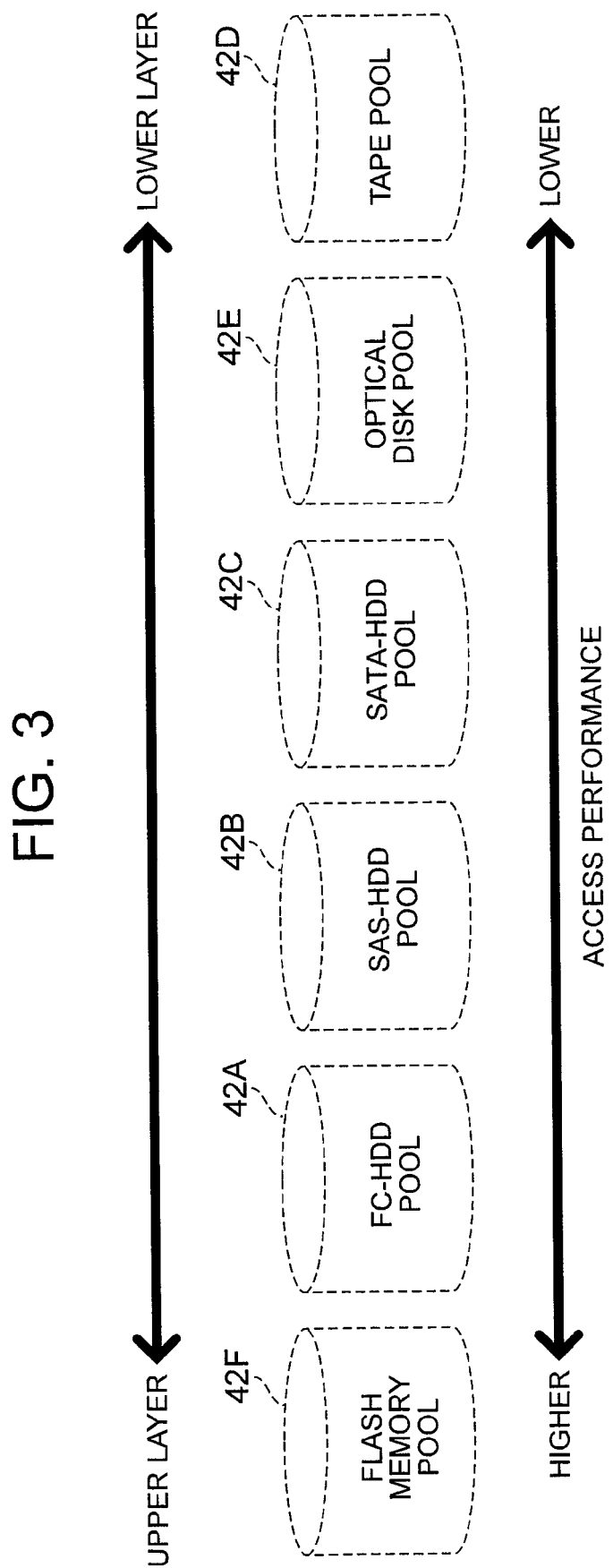
FIG. 3 is a view for showing a relationship between a type of a pool formed in an embodiment of the present invention and an access performance thereof.

FIG. 3 is a view for showing a relationship between a type of the pool 42 formed in an embodiment of the present invention and an access performance thereof.

As described above, for the storage system 3, the pools 42 of a plurality of types corresponding to a type the storage device 37 are formed. FIG. 3 shows the types of the pools 42 formed in the storage system 3 in accordance with the embodiment of the present invention. The flash memory pool 42F is a pool 42 to which a real area of the flash memory device 37F is registered. The FC-HDD pool 42A is a pool 42 to which a real area of the FC-HDD 37A is registered. The SAS-HDD pool 42B is a pool 42 to which a real area of the SAS-HDD 37B is registered. The SATA-HDD pool 42C is a pool 42 to which a real area of the SATA-HDD 37C is registered. The optical disk pool 42E is a pool 42 to which a real area of the optical disk device 37E is registered. The tape pool 42D is a pool 42 to which a real area of the tape device 37D is registered. Moreover, although a pool 42 to which a real area of the external storage device 37G is registered is also formed, the pool 42 is omitted here.

In the embodiment of the present invention, an access performance of the pool 42 is an access performance of a real area that is registered to the pool 42 (to put it differently, a real page 52 that configures the pool 42). Consequently, an access performance of the pool 42 depends on an access performance of the storage device 37 that is a basis for forming the pool 42 (the storage device 37 that is a basis of the LDEV 43 registered to the pool 42). Therefore, a relationship of an access performance of a pool 42 is equivalent to a relationship of an access performance of the storage device 37. In the case in which the access performances of the pools 42 of a variety of types are compared with each other, as shown in FIG. 3, the flash memory pool 42F, the FC-HDD pool 42A, the SAS-HDD pool 42B, the SATA-HDD pool 42C, the optical disk pool 42E, and the tape pool 42D can be ranked in this descending order from a higher access performance.

The storage system 3 in accordance with the embodiment of the present invention is a hierarchical storage system in which an aggregation of the pools 42 of the same type (an aggregation of the real areas in the pool 42) is one layer. More specifically, the storage system 3 can decide a layer that is a data storage location (that is, a type of the pool 42) based on the characteristics of the data (such as a frequency of an access). The storage system 3 can carry out an efficient data management by storing data to a layer suitable for the characteristics of the data (by storing to a real area in a suitable layer). Hereafter, a layer having an access performance higher than that of a layer compared with the layer is called "an upper layer", and a layer having an access performance lower than that of a layer compared with the layer is called "a lower layer".

In the embodiment of the present invention, the following three points are considered as the characteristics of the data for deciding a layer that is a data storage location: a frequency of an access of the data (the number of accesses to the data from the time when the data is stored into the present real page 52 to the present time), a time that has elapsed from the point when the data is created, and a time that has elapsed from the point when the data is accessed (written or read) for the last time. For instance, the CTL 31 of the storage system 3 can carry out an efficient data management by storing data having a higher frequency of an access in an upper layer and by storing data having a lower frequency of an access in a lower layer. The criteria for deciding a layer that is a data storage location, in that which layer is stored into in the case of what kind of data characteristics, is set by a user in advance for instance.

The characteristics of the data to be considered in the embodiment of the present invention can be obtained after the data is stored. Consequently, in the case in which data is stored newly, the CTL 31 cannot obtain the data characteristics related to the data that is stored newly. Therefore, the CTL 31 cannot decide a layer that is a data storage location based on the data characteristics. Accordingly, the CTL 31 stores data into the initial pool 42 that is set in advance for every virtual VOL 41 (hereafter referred to as an initial pool 42) (the CTL 31 stores data into a real area in the initial pool 42). For instance, the initial pool 42 can be a pool 42 that has been specified by a user, or a pool 42 in a layer having an intermediate access performance (for instance, the SAS-HDD pool 42B or the SATA-HDD pool 42C in the embodiment of the present invention).

The characteristics of the data to be considered in the embodiment of the present invention are changed as time goes on. The CTL 31 judges whether a layer that is a data storage location is changed or not regularly or irregularly, or when the data is accessed. In the case in which it is decided that a layer that is a data storage location is changed, the CTL 31 changes a present layer that is a data storage location to a more suitable layer. In the following descriptions, a processing for changing a layer that is a data storage location is called "a layer change processing".

Figure 4:
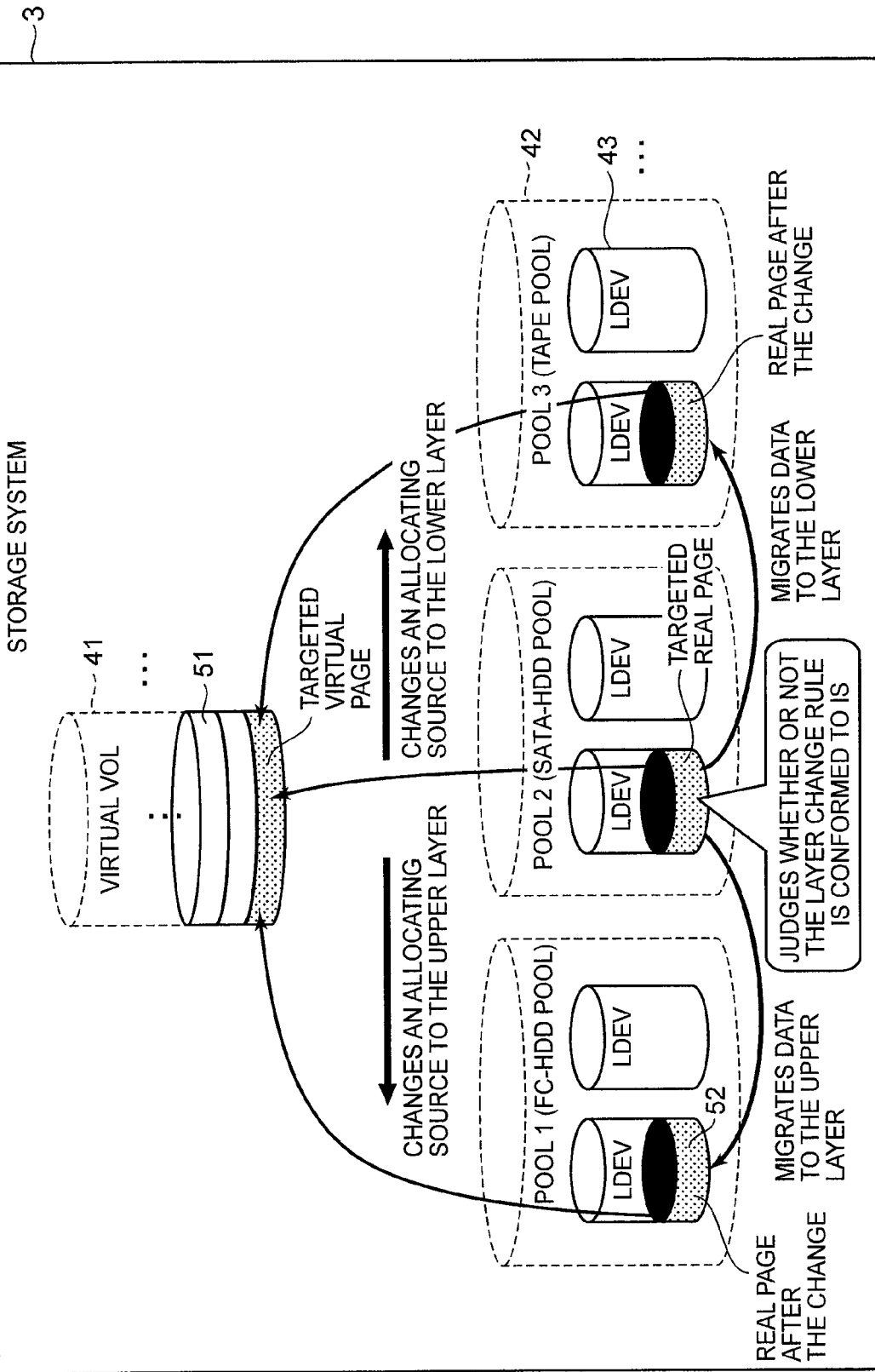
FIG. 4 is a view for illustrating an outline of a layer change processing.

FIG. 4 is a view for illustrating an outline of a layer change processing.

The layer change processing is carried out according to the following steps (1) to (3) for instance.

(1) Judgment of Whether a Layer is Changed or Not

The CTL 31 judges whether a storage location of the data stored into the real page 52 is changed to another layer or not for each of the real page 52 in which data is stored (that is, the real page 52 that is allocated to the virtual page 51). More specifically, the CTL 31 obtains the data characteristics related to the data (hereafter referred to as targeted data in the descriptions of FIG. 4) that is stored into the real page 52 that is targeted (hereafter referred to as a targeted real page 52 in the descriptions of FIG. 4) from a real page control table that is described later. The CTL 31 then judges whether the obtained data characteristics conform to the conditions specified in advance (hereafter referred to as a layer change rule). The layer change rule is classified into a layer up rule that is a condition for changing to the upper layer and a layer down rule that is a condition for changing to the lower layer. The layer change rule is recorded in a layer change table that will be described later. The layer change table records a layer to be changed in the case in which the layer change rule is conformed to (that is, the information that indicates a layer after the change) in addition to the layer change rule. In the case in which the layer change rule is conformed to, the CTL 31 carries out the following steps (2) and (3) to change a storage location of the targeted data to a layer after the change.

(2) Migration of Data

The CTL 31 migrates the targeted data into a real page 52 that is not allocated among the real pages 52 in the layer after the change (hereafter referred to as the real page 52 after the change) from the targeted real page 52.

(3) Change of an Allocating Source of the Virtual Page 51

The CTL 31 changes an allocating source from a real page 52 before the change (that is, a targeted real page 52) to a real page 52 after the change for the virtual page 51 to which the targeted real page 52 has been allocated (hereafter referred to as a targeted virtual page 51 in the descriptions of FIG. 4). More specifically, the CTL 31 cancels an allocation of the targeted real page 52 to the targeted virtual page 51, and allocates the real page 52 after the change to the targeted virtual page 51. In FIG. 4, an upper layer and a lower layer are illustrated as the real page 52 after the change. However, the real page 52 after the change is any one of the upper layer and the lower layer in practice.

The above described the outline of the layer change processing. As described above, in the layer change processing in accordance with the embodiment of the present invention, the real page 52 that is an area in which data is stored in practice is changed to another type. On the other hand, the virtual page 51 that can be recognized by the host 1 is not changed. Consequently, the host 1 can access the data that has been stored in the real page 52 after the change (that is, a real page 52 of which the type is changed) by accessing the targeted virtual page 51 similarly to the case before the layer change processing is carried out.

Figure 5:
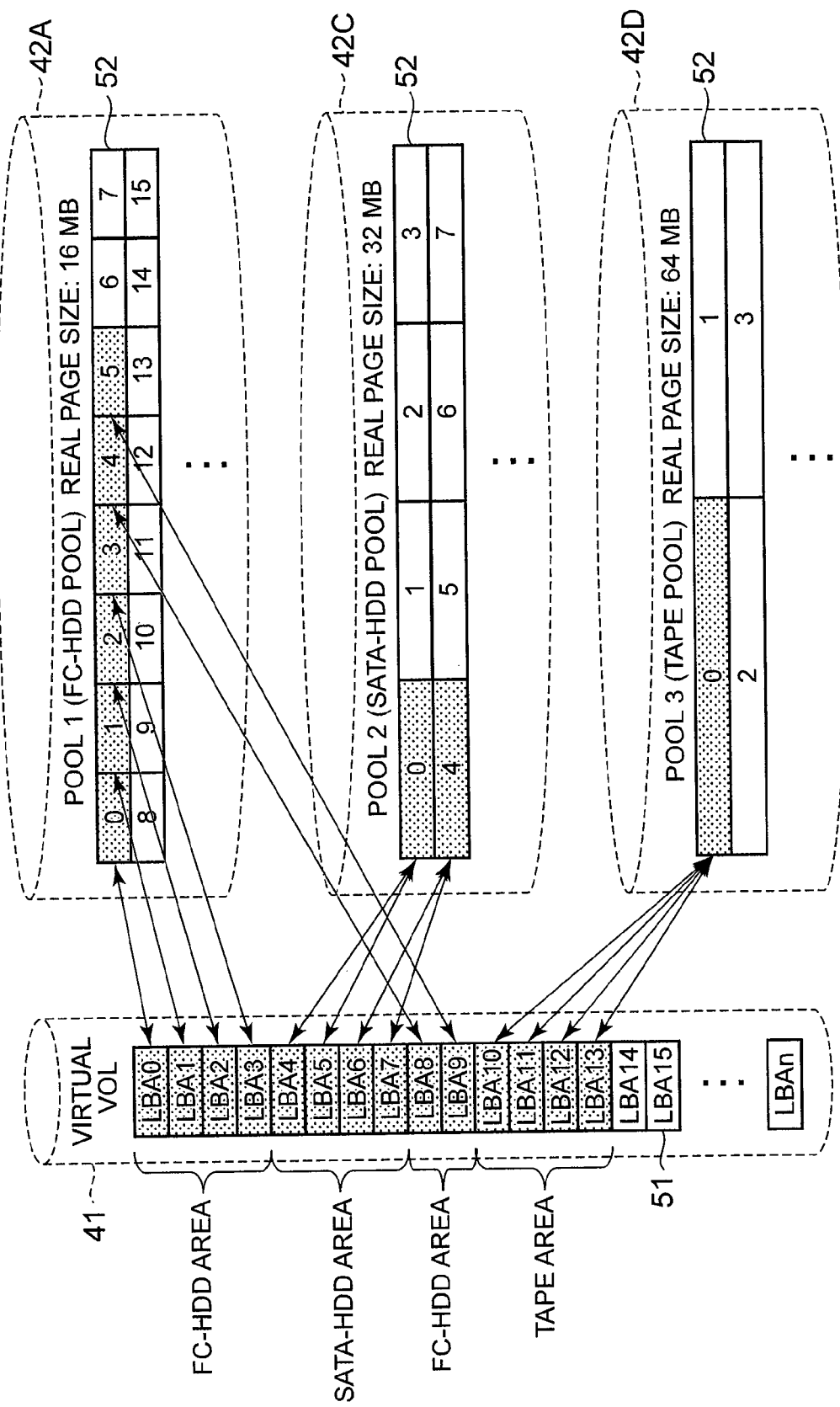
FIG. 5 is a view for showing an example of an allocation of a real page to a virtual page.

FIG. 5 is a view for showing an example of an allocation of a real page to a virtual page.

Each of the virtual page 51 that configures the virtual VOL 41 is specified by the LBA. In FIG. 5, an LBA number ("LBA0" to "LBAn") is allocated to each of the virtual page 51. The LBA number indicates the range from the start LBA to the end LBA of the virtual page 51 in practice. For instance, "LBA0" indicates the range from the start LBA "0000" to the end LBA "0099".

On the other hand, each of the real page 52 in a pool 41 is specified by a page number. In FIG. 5, a numerical number is added to each of the real page 52, and the numerical number is a page number. The page number is a unique value in each of the pool 42.

In the embodiment of the present invention, a size of the real page 52 differs depending on a type of the pool 42 (layer) including the real page 52. More specifically, as a layer is lower, a size of the real page 52 in the layer is set larger. (However, it is not necessary that a size of the real page 52 differs for all layers. For instance, a size of the real page 52 can be set to be equivalent to each other for adjacent layers (for instance, two layers).) For instance, a size of the real page 52 in a lower layer is set to N times of a size of the real page 52 in an upper layer (N is a natural number). A size of the virtual page 51 is set to be equivalent to or less than a size of the real page 52 that is set to be smallest. (For instance, a size of the virtual page 51 is set to 1/N (N is a natural number) of a size of the real page 52 that is set to be smallest.) In the example of FIG. 5, a size of the real page 52 in the FC-HDD pool 42A is set to be equivalent to a size of the virtual page 51 (for instance, 16 MB (megabytes)). Moreover, a size of the real page 52 in the SATA-HDD pool 42C in a layer lower than the FC-HDD pool 42A is set twice the size of the real page 52 in the FC-HDD pool 42A (for instance, 32 MB). Moreover, a size of the real page 52 in the tape pool 42D in a layer lower than the SATA-HDD pool 42C is set twice the size of the real page 52 in the SATA-HDD pool 42C, that is, fourfold the size of the real page 52 in the FC-HDD pool 42A (for instance, 64 MB).

In FIG. 5, a line connecting between a virtual page 51 and a real page 52 indicates a relationship of an allocation of the both pages 51 and 52 (that is, the real page 52 is allocated to the virtual page 51).

As shown in FIG. 5, a virtual page 51 and a real page 52 in the FC-HDD pool 42A are allocated to each other on one-on-one level. This is because a size of a virtual page 51 is equivalent to a size of a real page 52 in the FC-HDD pool 42A.

On the other hand, a size of the real page 52 in the SATA-HDD pool 42C is twice the size of the virtual page 51. Consequently, a real page 52 is allocated to two continuous virtual pages 51 for the SATA-HDD pool 42C.

Moreover, a size of the real page 52 in the tape pool 42D is twice the size of the real page 52 in the SATA-HDD pool 42C, that is, fourfold the size of the virtual page 51. Consequently, a real page 52 is allocated to four continuous virtual pages 51 for the tape pool 42D.

The shared memory 33 of the storage system 3 stores the information for controlling each of the real page 52 (hereafter referred to as real page control information) for all real pages 52 that is registered in the pool 42 although this will be described later. The real page control information is prepared for every real page 52. Consequently, as the number of real pages 52 is larger, the number of the real page control information is larger, and the entire size of the real page control information (the total sum of a size of all of the real page control information) is larger. Consequently, even if the size of the entire real areas is the same, in the case in which a size of the real page 52 that is configured by the entire real areas is set to be large (to put it differently, the number of the real pages 52 that are configured by the entire real areas is set to be small), the entire size of the real page control information can be small.

On the other hand, as a size of the real page 52 is larger, it is more difficult to store the data into the layer suitable for the characteristics. (To be exact, even in the case in which data is thought to be stored into the layer suitable for the data characteristics, data is stored into the layer that is not so suitable for the data characteristics in practice in some cases). This is because as a size of the real page 52 is larger, the characteristics of the data stored into the real page 52 may be variable. To explain in more detail, in the case in which a size of the real page 52 is 16 MB and a size of one file is 1 MB, one real page 52 can store the data that configures 16 files. In the case in which the data that configures 16 files is stored, the data characteristics include a frequency of an access of each of the 16 files. On the other hand, in the case in which a size of the real page 52 is 64 MB and a size of one file is 1 MB similarly to the above, one real page 52 can store the data that configures 64 files. In the case in which the data that configures 64 files is stored, the data characteristics include a frequency of an access of each of the 64 files. That is, in the case in which a size of the real page 52 is 64 MB, the data characteristics include a frequency of an access of more files. Consequently, the characteristics of the data can be variable more easily. For instance, in the case in which a frequency of an access is extremely high for only one of the 64 files and the other 63 files are hardly accessed, the data that configures the 64 files may be stored into the upper layer. In this case, although the data that configures one file having a high access frequency is stored into a layer suitable for the data characteristics, the data that configures the other files is stored into a layer that is not suitable for the data characteristics. As a size of the real page 52 is smaller, an amount of data that is stored into a layer that is not suitable for the data characteristics (the number of files that configure the data) can be less.

In the embodiment of the present invention, as a layer is lower, the entire size of the real page control information is smaller and a memory size that is required for storing the real page control information is smaller by setting a size of the real page 52 in the layer to be larger. On the other hand, for an upper layer (that is, a layer having a high access performance), a size of the real page 52 is set to be smaller. Consequently, the entire size of the real page control information can be smaller, and the data having a high access frequency can be stored into a layer suitable for the data characteristics.

The layer change processing will be described below in detail with reference to FIGS. 6 to 9. Before a change of a layer is carried out, a state of an allocation of the real page 52 to the virtual page 51 is a state shown in FIG. 5. In the following descriptions, as the pools of three types among the pools of six types shown in FIG. 3, the FC-HDD pool 42A, the SATA-HDD pool 42C, and the tape pool 42D are used as an example. In addition, to easily understand the upper and lower layers including the pools, the FC-HDD pool 42A is called "pool 1", the SATA-HDD pool 42C is called "pool 2", and the tape pool 42D is called "pool 3" (a pool having a smaller number is in an upper layer). Moreover, in the following descriptions, a virtual page 51 in which an LBA number is LBAn (n is an integer number) is called "virtual page (n)" (for instance, a virtual page 51 in which an LBA number is LBA4 is called "virtual page (4)"), and a real page 52 of a page number x (x is an integer number) in a pool m (m is the number of a pool and an integer number) is called "real page (m-x)" (for instance, a real page 52 of a page number 6 in a pool 1 is called "real page (1-6)").

Figure 6:
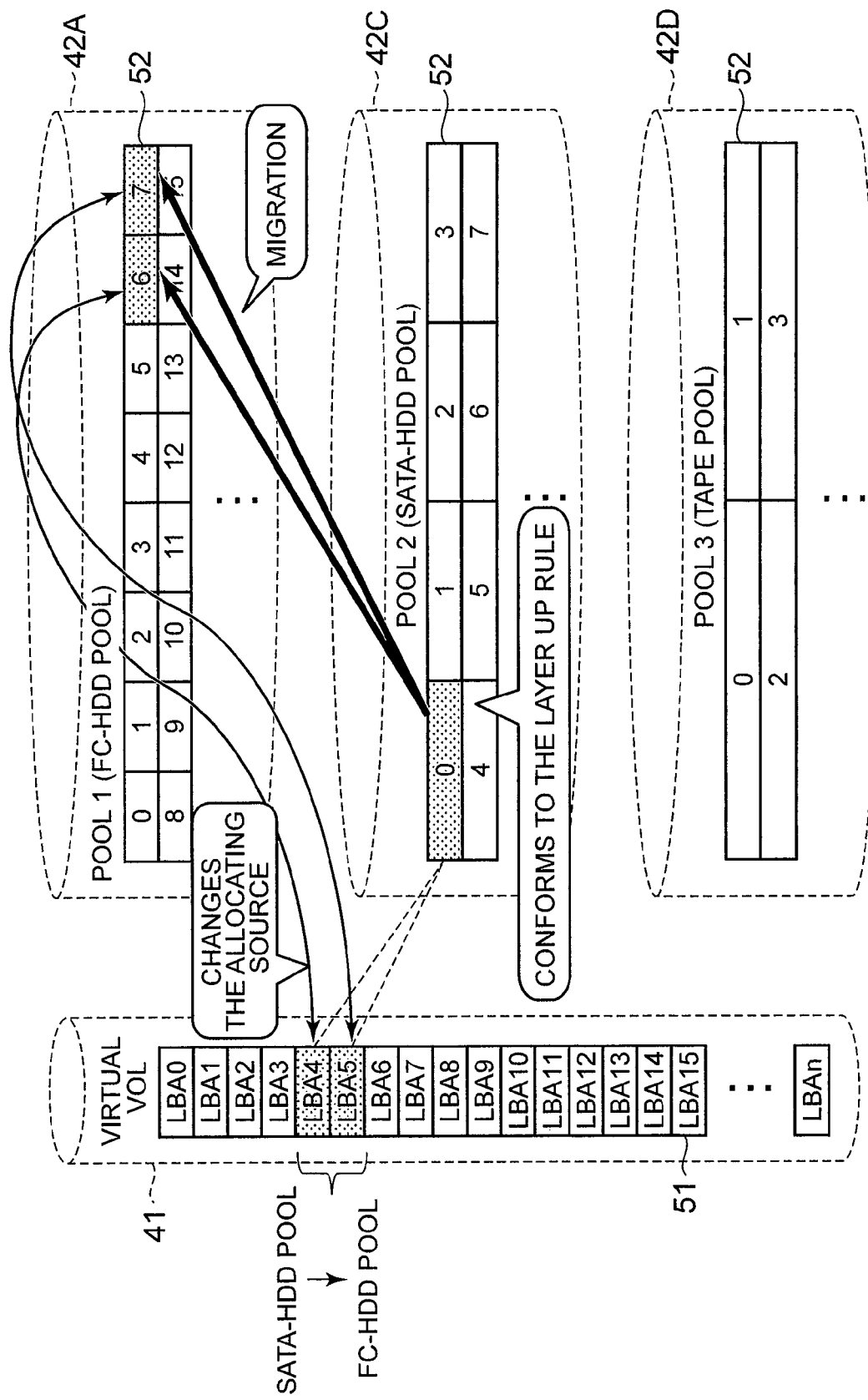
FIG. 6 is a view for showing an example of a layer change from a pool 2 (SATA-HDD pool) to a pool 1 (FC-HDD pool).

FIG. 6 is a view for showing an example of a layer change from a pool 2 to a pool 1. In this example, the pool 2 is a pool before a change, and the pool 1 is a pool after a change.

FIG. 6 simulates the case in which the data characteristics of the data that has been stored into a real page (2-0) of the pool 2 (hereafter referred to as a targeted data in the descriptions of FIG. 6) conform to the layer up rule. As shown in FIGS. 5 and 6, the real page (2-0) is allocated to continuous two virtual pages (4) and (5). This is because a size of a real page in the pool 2 is twice the size of a virtual page.

The CTL 31 selects a real page 52 that is not allocated among the real pages 52 in the pool 1 after the change (for instance, the real pages (1-6) and (1-7) are selected). The reason why two real pages 52 have been selected from the pool 1 after the change is that a size of a real page 52 in the pool 2 before the change is twice the size of the real page 52 in the pool 1 after the change. In the illustration of FIG. 6, continuous two real pages (1-6) and (1-7) are selected. However, it is not necessary to select continuous real pages (for instance, discontinuous real pages (1-6) and (1-13) can also be selected).

After that, the CTL 31 migrates the targeted data from the real page (2-0) before the change to the real pages (1-6) and (1-7) after the change. More specifically, the CTL 31 separates the targeted data into two parts, and moves one part of the two targeted data to the real page (1-6) and the other part of the two targeted data to the real page (1-7).

After that, the CTL 31 cancels an allocation of the real page (2-0) before the change to the virtual pages (4) and (5), and newly allocates the real pages (1-6) and (1-7) after the change to the virtual pages (4) and (5). Here, a size of the virtual page 51 is equivalent to a size of the real page 52 after the change. Consequently, the real page 52 after the change is allocated to the virtual page 51 on one-on-one level. The allocation of the real page 52 after the change is carried out on the virtual page 51 in such a manner that a continuity of data can be maintained. More specifically, in the illustration of FIG. 6, the real page (1-6) into which the first half part of the targeted data separated into two parts has been stored is allocated to the virtual page (4) having the smallest LBA number among the virtual pages (4) and (5). Moreover, the real page (1-7) into which the second half part of the targeted data separated into two parts has been stored is allocated to the virtual page (5) that follows the virtual page (4).

By the above processing, a storage location of data that has been stored into the virtual pages (4) and (5) (in practice, that has been stored into the real page (2-0) that has been allocated to the virtual pages (4) and (5)) is changed from the pool 2 (the SATA-HDD pool 42C) to the pool 1 (the FC-HDD pool 42A) (a layer up is carried out).

Figure 7:
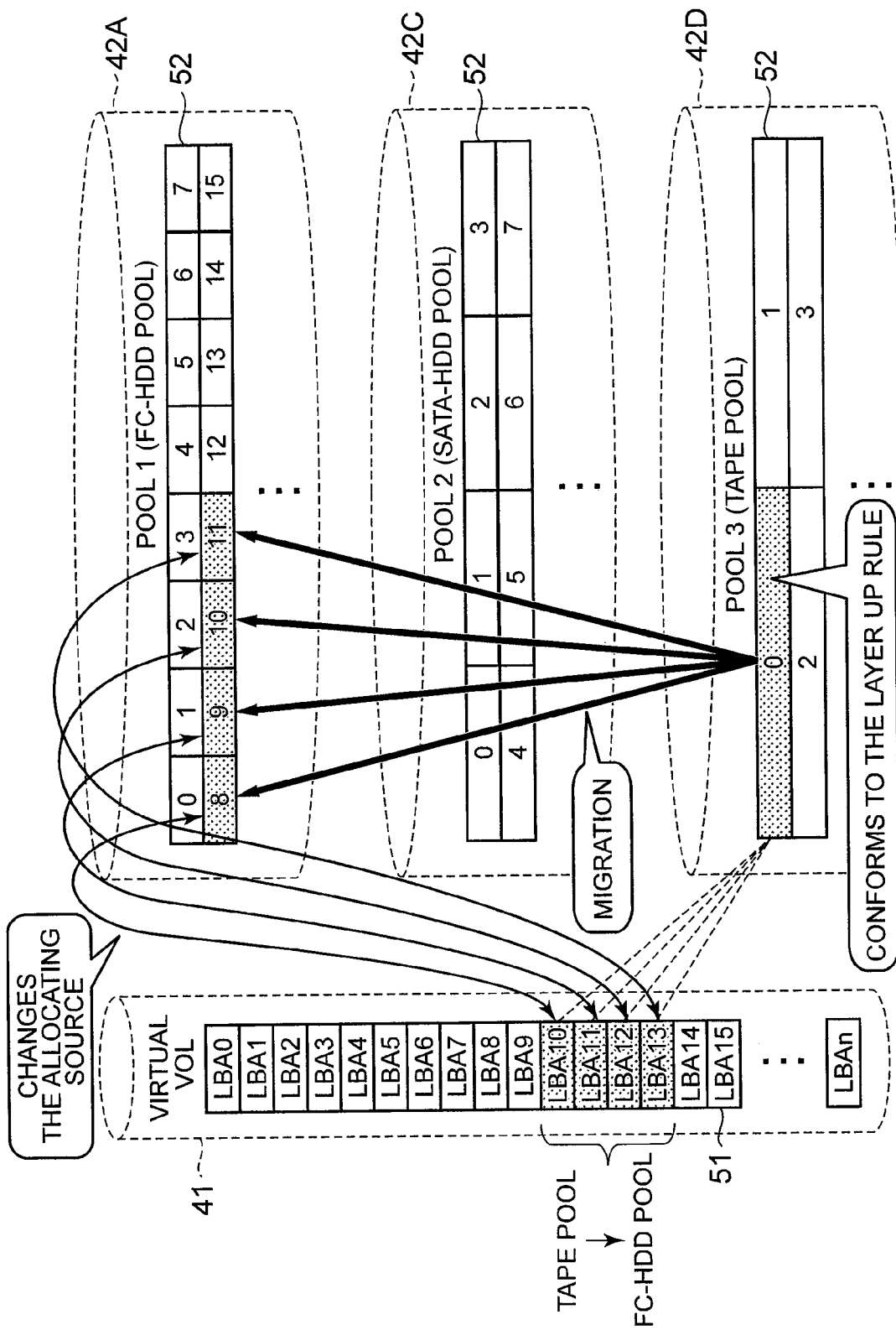
FIG. 7 is a view for showing an example of a layer change from a pool 3 (tape pool) to a pool 1 (FC-HDD pool).

FIG. 7 is a view for showing an example of a layer change from a pool 3 to a pool 1. In this example, the pool 3 is a pool before a change, and the pool 1 is a pool after a change.

FIG. 7 simulates the case in which the data characteristics of the data that has been stored into a real page (3-0) of the pool 2 (hereafter referred to as a targeted data in the descriptions of FIG. 7) conform to the layer up rule. As shown in FIGS. 5 and 7, the real page (3-0) is allocated to the virtual pages (10) to (12).

The CTL 31 selects the real pages (1-8), (1-9), (1-10), and (1-11) that is not allocated among the real pages 52 in the pool 1 after the change (the FC-HDD pool 42A). The reason why four real pages 52 have been selected from the pool 1 after the change is that a size of a real page 52 in the pool 2 before the change is fourfold the size of the real page 52 in the pool 1 after the change. In the illustration of FIG. 7, continuous two real pages (1-8), (1-9), (1-10), and (1-11) are selected. However, it is not necessary to select continuous real pages (for instance, discontinuous real pages (1-1), (1-6), (1-9), and (1-14) can also be selected).

After that, the CTL 31 migrates the targeted data from the real page (3-0) before the change to the real pages (1-8), (1-9), (1-10), and (1-11) after the change. More specifically, the CTL 31 separates the targeted data into four parts, and moves each part of the four targeted data to each of the real pages (1-8), (1-9), (1-10), and (1-11) in such a manner that they do not overlap with each other.

After that, the CTL 31 cancels an allocation of the real Page (3-0) to the virtual pages (10) to (13), and newly allocates the real pages (1-8), (1-9), (1-10), and (1-11) after the change to the virtual pages (10) to (13). Here, a size of the virtual page 51 is equivalent to a size of the real page 52 after the change. Consequently, the real page 52 after the change is allocated to the virtual page 51 on one-on-one level. The allocation of the real page 52 after the change is carried out on the virtual page 51 in such a manner that a continuity of data can be maintained. More specifically, in the illustration of FIG. 7, the real page (1-8) into which the first part of the targeted data separated into four parts has been stored is allocated to the virtual page (10) having the smallest LBA number among the virtual pages (10) to (13). Moreover, the real page (1-9) into which the second part of the targeted data separated into four parts has been stored is allocated to the virtual page (11) that follows the virtual page (10). Moreover, the real page (1-10) into which the third part of the targeted data separated into four parts has been stored is allocated to the virtual page (12) that follows the virtual page (11). Moreover, the real page (1-11) into which the last part of the targeted data separated into four parts has been stored is allocated to the virtual page (13) that follows the virtual page (12).

By the above processing, a storage location of data that has been stored into the virtual pages (10) to (13) is changed from the pool 3 (the tape pool 42D) to the pool 1 (the FC-HDD pool 42A) (a layer up is carried out).

Figure 8:
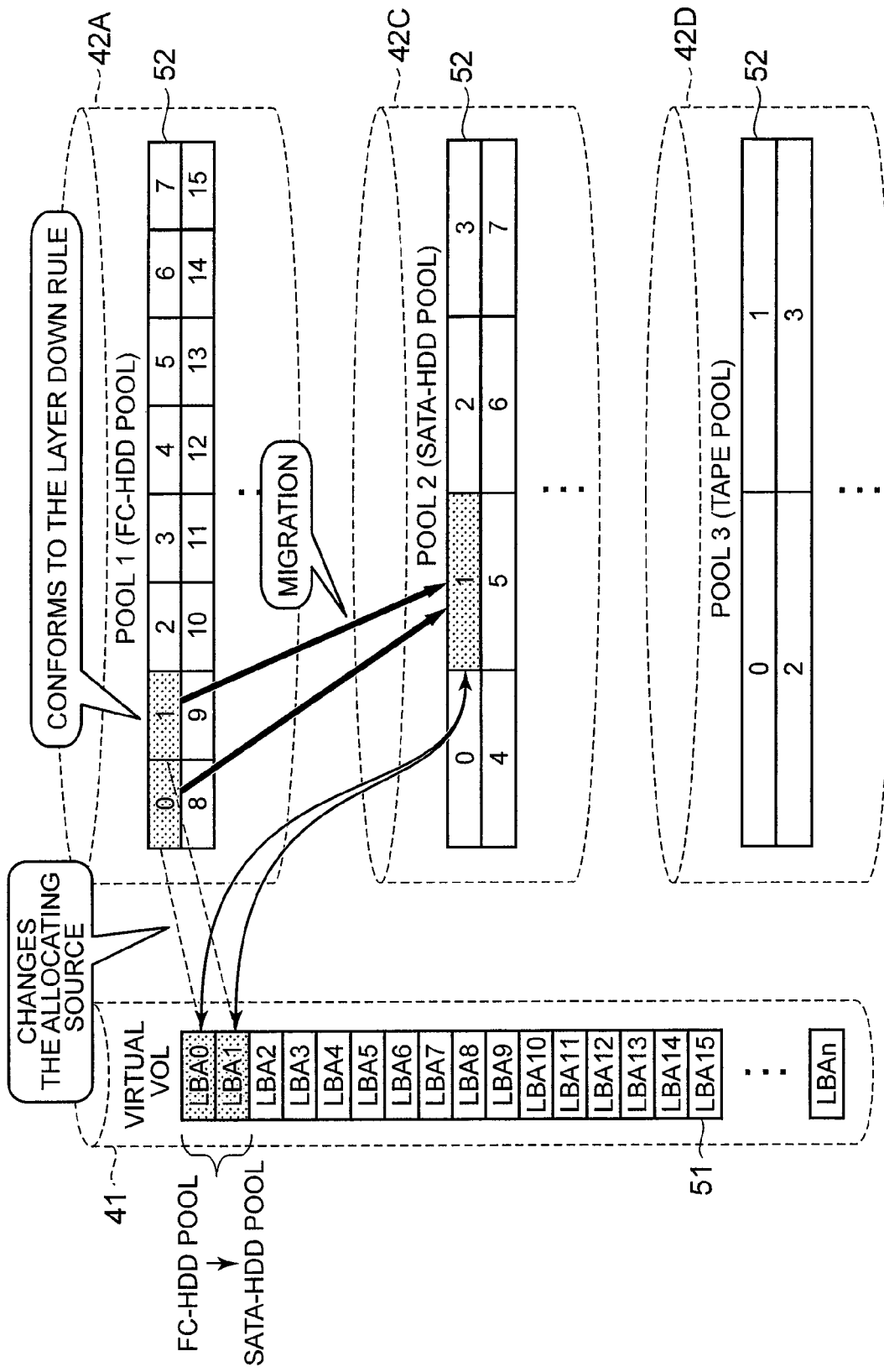
FIG. 8 is a view for showing an example of a layer change from a pool 1 (FC-HDD pool) to a pool 2 (SATA-HDD pool).

FIG. 8 is a view for showing an example of a layer change from a pool 1 to a pool 2. In this example, the pool 1 is a pool before a change, and the pool 2 is a pool after a change.

FIG. 8 simulates the case in which the data characteristics of the data that has been stored into a real page (1-0) (hereafter referred to as the targeted data in the descriptions of FIG. 8) conform to the layer down rule. As shown in FIGS. 5 and 8, the real page (1-0) is allocated to the virtual page (0).

A size of a real page 52 in the pool 2 after the change (the SATA-HDD pool 42C) is twice the size of the real page 52 in the pool 1 before the change (the FC-HDD pool 42A). The CTL 31 judges whether it is appropriate that the data that is continuous to the targeted data and that has a size equivalent to that of the targeted data (hereafter referred to as the continuous data in the descriptions of FIG. 8) is also changed to the pool 2 after the change in addition to the targeted data or not. More specifically, the CTL 31 judges whether the continuous data conforms to the layer down rule to which the targeted data conforms (that is, a rule for specifying the change to the pool 2) or not. Here, that two data are continuous means that two virtual pages 51 into which each of the both data has been stored (to be exact, to which the real pages 52 into which each of the both data has been stored are allocated) are continuous. Consequently, the continuous data is data that has been stored into the virtual page (1) continuous to the virtual page (0). In the following descriptions of FIG. 8, the virtual page (1) continuous to the targeted virtual page (0) is called "continuous virtual page (1)", and a real page (1-1) that is allocated to the continuous virtual page (1) (that is, a real page (1-1) into which the continuous data has been stored) is called "continuous real page (1-1)".

In the case in which the CTL 31 judges that the continuous data in addition to the targeted data conforms to the rule for specifying the change to the pool 2, the storage locations of the targeted data and the continuous data are changed to the pool 2 together. On the other hand, in the case in which the CTL 31 judges that the continuous data does not conform to the rule for specifying the change to the pool 2, the storage locations of the targeted data and the continuous data are not changed. The case in which the storage locations of the targeted data and the continuous data are changed to the pool 2 will be described in the following.

The CTL 31 selects the real page (2-1) that is not allocated among the real pages 52 in the pool 2 after the change.

After that, the CTL 31 migrates the targeted data and the continuous data from the targeted real page (1-0) and the continuous real page (1-1) to the real page (2-1) after the change. More specifically, the CTL 31 connects the targeted data and the continuous data to each other, and moves the connected data to the real page (2-1) after the change.

After that, the CTL 31 cancels an allocation of the targeted real page (1-0) to the targeted virtual page (0) and an allocation of the continuous real page (1-1) to the continuous virtual page (1). The CTL 31 then newly allocates a real page (2-1) after the change to the targeted virtual page (0) and the continuous virtual page (1). That is, since a size of the real page 52 in the pool 2 after the change is twice the size of the virtual page 51, a real page (2-1) in the pool 2 after the change is allocated to the two continuous virtual pages (0) and (1).

By the above processing, a storage location of data that has been stored into each of the targeted virtual page (0) and the continuous virtual page (1) is changed from the pool 1 (the FC-HDD pool 42A) to the pool 2 (the SATA-HDD pool 42C) (a layer down is carried out).

Figure 9:
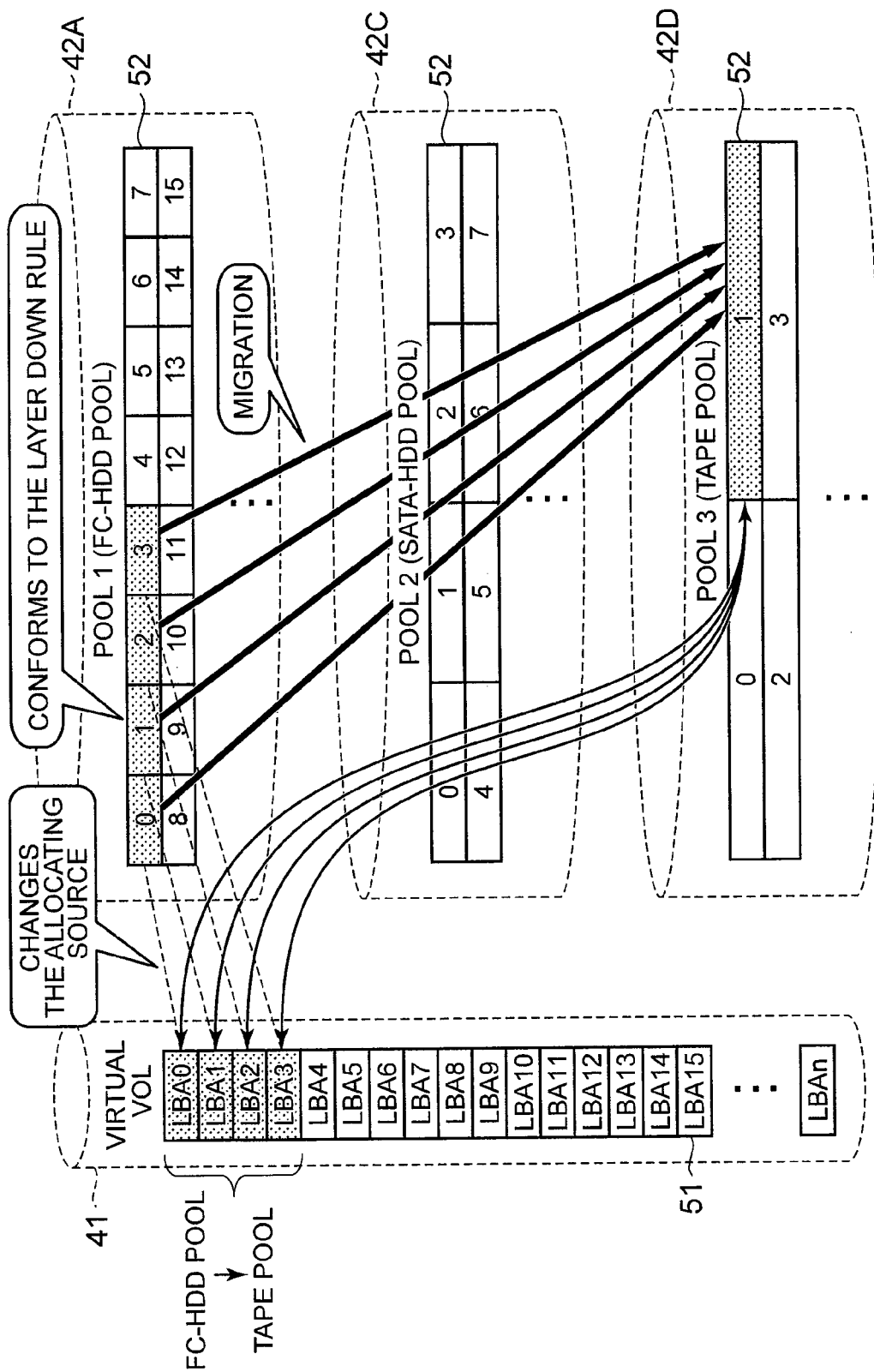
FIG. 9 is a view for showing an example of a layer change from a pool 1 (FC-HDD pool) to a pool 3 (tape pool).

FIG. 9 is a view for showing an example of a layer change from a pool 1 to a pool 3. In this example, the pool 1 is a pool before a change, and the pool 3 is a pool after a change.

FIG. 9 simulates the case in which the data characteristics of the data that has been stored into a real page (1-0) (hereafter referred to as the targeted data in the descriptions of FIG. 9) conform to the layer down rule. As shown in FIGS. 5 and 9, the real page (1-0) is allocated to the virtual page (0).

A size of a real page 52 in the pool 3 after the change (the tape pool 42D) is fourfold the size of the real page 52 in the pool 1 before the change (the FC-HDD pool 42A). The CTL 31 judges whether it is appropriate that three data that are continuous from the targeted data and that have a size equivalent to that of the targeted data (hereafter referred to as the continuous data in the descriptions of FIG. 9) are also changed to the pool 3 after the change in addition to the targeted data or not. More specifically, the CTL 31 judges whether all of the continuous data conforms to the layer down rule to which the targeted data conforms (that is, a rule for specifying the change to the pool 3) or not. Here, the continuous data is three data: data that has been stored into the virtual page (1) continuous to the virtual page (0), data that has been stored into the virtual page (2) continuous to the virtual page (1), and data that has been stored into the virtual page (3) continuous to the virtual page (2). In the following descriptions of FIG. 9, each of the three virtual pages (1) to (3) continuous from the targeted virtual page (0) is called "continuous virtual pages (1) to (3)", and the real pages (1-1), (1-2), and (1-3) that are allocated to the continuous virtual pages (1) to (3) are called "continuous real pages (1-1), (1-2), and (1-3)".

In the case in which the CTL 31 judges that all of the continuous data in addition to the targeted data conforms to the rule for specifying the change to the pool 3, the storage locations of the targeted data and all of the continuous data are changed from the pool 1 to the pool 3 together. On the other hand, in the case in which the CTL 31 judges that at least one of the continuous data does not conform to the rule for specifying the change to the pool 3, the storage locations of the targeted data and the continuous data are not changed. The case in which the storage locations of the targeted data and the continuous data are changed to the pool 3 will be described in the following.

The CTL 31 selects the real page (3-1) that is not allocated among the real pages 52 in the pool 3 after the change.

After that, the CTL 31 migrates the targeted data and all of the continuous data from the targeted real page (1-0) and all of the continuous real pages (1-1), (1-2), and (1-3) to the real page (3-1) after the change. More specifically, the CTL 31 connects the targeted data and all of the continuous data to each other, and moves the connected data to the real page (3-1) after the change.

After that, the CTL 31 cancels an allocation of the targeted real page (1-0) to the targeted virtual page (0) and an allocation of the continuous real pages (1-1), (1-2), and (1-3) to the continuous virtual pages (1) to (3). The CTL 31 then newly allocates a real page (3-1) after the change to the targeted virtual page (0) and the continuous virtual pages (1-1), (1-2), and (1-3). That is, since a size of the real page 52 in the pool 3 after the change is fourfold the size of the virtual page 51, a real page (3-1) in the pool 3 after the change is allocated to the four continuous virtual pages (0) to (3).

By the above processing, a storage location of data that has been stored into each of the targeted virtual page (0) and the continuous virtual pages (1) to (3) is changed from the pool 1 (the FC-HDD pool 42A) to the pool 3 (the tape pool 42D) (a layer down is carried out).

A variety of tables (a virtual VOL control table 61, a pool control table 62, a real page control table 63, and a layer change rule table 64) that are stored into the shared memory 33 included in the storage system 3 will be described below in detail with reference to FIGS. 10 to 13. The variety of tables 61, 62, 63, and 64 can also be stored into the cache memory 34.

FIG. 10 is a view for showing an example of a virtual VOL control table 61.

The virtual VOL control table 61 is a table for controlling the information related to the virtual VOL 41 that is formed in the storage system 3. More specifically, the virtual VOL control table 61 is a table for controlling whether any of the real pages 52 is allocated or not to each of the virtual pages 51 that configure the virtual VOL 41 and the real page 52 that is allocated in the case in which the real page 52 is allocated. For instance, as shown in FIG. 10, the virtual VOL control table 61 records the LBA 612 for specifying the virtual page 51, a pool ID 613 of a pool 42 to which the real page 52 that is allocated to the virtual page 51 (hereafter referred to as an allocation real page 52 in the descriptions of FIG. 10) is registered, a pool type 614 of a pool 42 to which the allocation real page 52 is registered, and a page number 615 of the allocation real page 52, for every virtual page 51 that configures the virtual VOL 41, in such a manner that the items are corresponded to each other.

FIG. 11 is a view for showing an example of a pool control table 62.

The pool control table 62 is a table for controlling the information related to the pool 42 that is formed in the storage system 3. In the following, the information related to the pool 42, which is controlled by the pool control table 62, is called "pool control information". For instance, the pool control table 62 records a pool ID 621, a pool type 622, a pool volume 623, a real page size 624, the total number of real pages 625, the number of used real pages 626, the number of empty real pages 627, a used real page queue pointer 628, an empty real page queue pointer 629, a data created date and time queue pointer 62A, a final data update date and time queue pointer 62B, and a final data access date and time queue pointer 62C, for every pool 42 that is formed in the storage system 3, in such a manner that the items are corresponded to each other.

The pool ID 621 is the information for uniquely specifying a pool 42. The pool type 622 is the information for indicating a type of the pool 42 that is specified by the corresponding pool ID 621 (hereafter referred to as a corresponding pool 42 in the descriptions of FIG. 11). The pool volume 623 is a total volume of the corresponding pool 42 (that is, the total sum of sizes of all real pages 52 in the corresponding pool 42). The real page size 624 is a size of the real page 52 in the corresponding pool 42. The total number of real pages 625 is the total number of the real pages 52 in the corresponding pool 42. The number of used real pages 626 is the number of the real pages 52 that are used in the corresponding pool 42 (that is, the real pages 52 that are allocated to the virtual page 51, and hereafter referred to as a used real page 52). The number of empty real pages 627 is the number of the real pages 52 that are not used in the corresponding pool 42 (that is, the real pages 52 that are not allocated to the virtual page 51, and hereafter referred to as an empty real page 52).

The used real page queue pointer 628 is a queue pointer that is used for controlling the used real page 52 in the corresponding pool 42 (a pointer that configures a queue structure). The empty real page queue pointer 629 is a queue pointer that is used for controlling the empty real page 52 in the corresponding pool 42. The data created date and time queue pointer 62A is a queue pointer that is used for controlling the data created date and time for data that has been stored in each of all the used real pages 52 in the corresponding pool 42. The final data update date and time queue pointer 62B is a queue pointer that is used for controlling the final data update date and time (date and time when the data is updated finally) for data that has been stored in each of all the used real pages 52 in the corresponding pool 42. The final data access date and time queue pointer 62C is a queue pointer that is used for controlling the final data access date and time (date and time when the data is accessed (written or read) finally) for data that has been stored in each of all the used real pages 52 in the corresponding pool 42. The manners of utilizing the queue pointers 628 to 62C will be described later.

FIG. 12 is a view for showing an example of a real page control table 63.

The real page control table 63 is a table for controlling the information related to the real page 52 that is registered to the pool 42 that is formed in the storage system 3. In the embodiment of the present invention, the information related to each of the real page 52, which is controlled by the page control table 63, is called "real page control information". The real page control table 63 is created for every pool 42 that is formed in the storage system 3. For instance, the real page control table 63 records a page number 631, a real page size 632, a virtual page of an allocated location 633, data characteristics 634, a queue pointer in a pool 635, a data created date and time queue pointer 636, a final data update date and time queue pointer 637, and a final data access date and time queue pointer 638, for every real page 52 in the pool 42 that is a target controlled by the real page control table 63, in such a manner that the items are corresponded to each other.

The page number 631 is the information for uniquely specifying the real page 52. The real page size 632 is a size of the real page 52 that is specified by the corresponding page number 631 (hereafter referred to as a corresponding real page 52 in the descriptions of FIG. 12). The virtual page of an allocated location 633 is the information that indicates a virtual page 51 to which the corresponding real page 52 is allocated (hereafter referred to as an allocated location virtual page 51 in the descriptions of FIG. 12). The virtual page of an allocated location 633 includes an ID of the virtual VOL 41 that includes the allocated location virtual page 51 and an LBA for specifying the allocated location virtual page 51. The data characteristics 634 are the data characteristics of data that has been stored into the corresponding real page 52 (hereafter referred to as the corresponding data in the descriptions of FIG. 12). In the embodiment of the present invention, the data characteristics 634 include the data created date and time, the final data update date and time, the final data access date and time, and the number of accesses. The data created date and time is the date and time when the corresponding data is newly created. The final data update date and time is the date and time when the corresponding data is finally updated. The final data access date and time is the date and time when the corresponding data is accessed (written or read) finally. The number of accesses is the number of accesses from the host 1 in the time period from when the corresponding data is stored into the corresponding real page 52 to the present time.

The queue pointer in a pool 635 is a queue pointer that is used for controlling the used real page 52 and the empty real page 52 in the pool 42 that includes the corresponding real page 52 (that is, the pool 42 is a pool 42 that is a target controlled by the real page control table 63, and hereafter referred to as corresponding pool 42 in the descriptions of FIG. 12). The queue pointer in a pool 635 is used together with the used real page queue pointer 628 or the empty real page queue pointer 629 in the pool control table 62. The data created date and time queue pointer 636 is a queue pointer that is used for controlling the data created date and time for data that has been stored in each of all the used real pages 52 in the corresponding pool 42. The data created date and time queue pointer 636 is used together with the data created date and time queue pointer 62A in the pool control table 62. The final data update date and time queue pointer 637 is a queue pointer that is used for controlling the final data update date and time for data that has been stored in each of all the used real pages 52 in the corresponding pool 42. The final data update date and time queue pointer 637 is used together with the final data update date and time queue pointer 62B in the pool control table 62. The final data access date and time queue pointer 638 is a queue pointer that is used for controlling the final data access date and time for data that has been stored in each of all the used real pages 52 in the corresponding pool 42. The final data access date and time queue pointer 638 is used together with the final data access date and time queue pointer 62C in the pool control table 62. The manners of utilizing the queue pointers 635 to 638 will be described later.

FIG. 13 is a view for showing an example of a layer change rule table 64.

The layer change rule table 64 is a table for controlling the criteria for deciding a layer that is a data storage location, that is, a layer that is stored into and types of data characteristics. For instance, the layer change rule table 64 records a layer change rule (a layer up rule and/or a layer down rule) related to a pool 42 for every pool 42 and the pool 42 after the change in the case in which the layer change rule is conformed to, in such a manner that the items are corresponded to each other.

A targeted pool 641 is the information that indicates a pool 42 to be targeted. The targeted pool 641 includes a pool ID 6411 that is an ID of the pool 42 to be targeted and a pool type 6412 that is the information that indicates a type of the pool 42 to be targeted. A rule type 642 is the information that indicates a type of a corresponding layer change rule (a layer up rule or a layer down rule). A layer change rule 643 includes a judgment item 6431 that is the information that indicates the data characteristics that are considered in the layer change rule and a condition 6432 that is the information that indicates the criteria for deciding whether the layer change rule is conformed to or not. A pool 644 after the change is the information that indicates the pool 42 after the change in the case in which the corresponding layer change rule is conformed to. The pool 644 after the change includes a pool ID 6441 that is an ID of the pool 42 after the change and a pool type 6442 that is the information that indicates a type of the pool 42 after the change.

For instance, in the example of FIG. 13, a layer down rule and a layer up rule are defined one by one for the SATA-HDD pool 42C in which the pool ID is "a pool 2". The layer down rule is that 365 days elapse from the data created date and time. The pool 42 after the change in the case in which the layer down rule is conformed to is a tape pool 42D in which the pool ID is "a pool 3". Consequently, in the case in which 365 days elapse from the data created date and time for the data (hereafter referred to as the targeted data in the descriptions of FIG. 13) that has been stored into a real page 52 (hereafter referred to as a targeted real page 52 in the descriptions of FIG. 13) in the SATA-HDD pool 42C in which the pool ID is "a pool 2", the layer down rule is conformed to. Therefore, a storage location of the targeted data is changed from the targeted real page 52 to the real page 52 in the tape pool 42D in which the pool ID is "a pool 3". Moreover, the layer up rule is that the number of accesses exceeds 10000 times. The pool 42 after the change in the case in which the layer up rule is conformed to is an FC-HDD pool 42A in which the pool ID is "a pool 1". Consequently, in the case in which the number of accesses to the targeted data exceeds 10000 times, the layer up rule is conformed to. Therefore, a storage location of the targeted data is changed from the targeted real page 52 to the real page 52 in the FC-HDD pool 42A in which the pool ID is "a pool 1".

Figure 14:
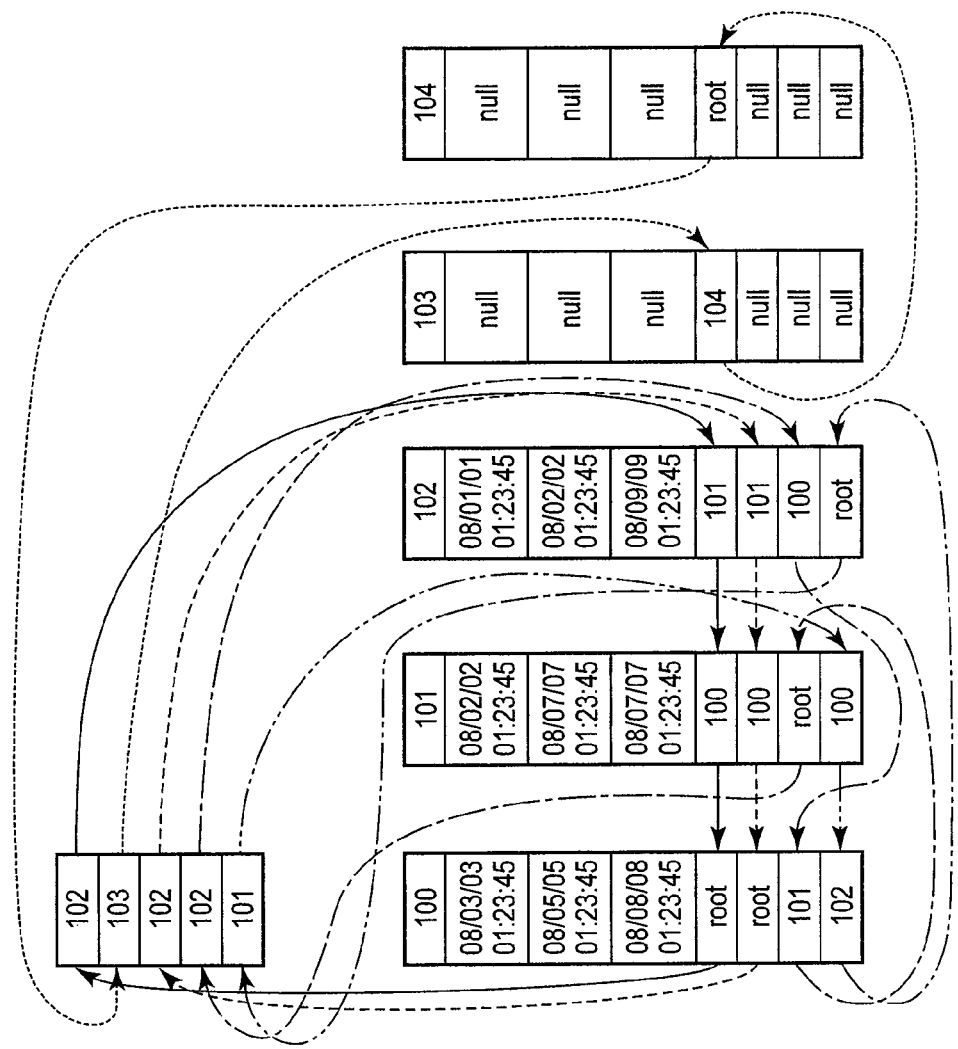
FIG. 14 is a view for showing a queue structure indicated by the pool control information and the real page control information.

FIG. 14 is a view for showing a queue structure indicated by the pool control information and the real page control information.

As shown in FIGS. 11 and 12, the pool control information and the real page control information include some queue pointers. In the embodiment of the present invention, the pool control information includes five items: a used real page queue pointer 628, an empty real page queue pointer 629, a data created date and time queue pointer 62A, a final data update date and time queue pointer 62B, and a final data access date and time queue pointer 62C. Moreover, the real page control information includes four items: a queue pointer 635 in a pool, a data created date and time queue pointer 636, a final data update date and time queue pointer 637, and a final data access date and time queue pointer 638. FIG. 14 illustrates the queue pointers 628 to 62C that are included in the pool control information (abbreviated as "QP" in FIG. 14) and the data characteristics 634 and the queue pointers 635 to 638 that are included in the real page control information.

A pool 42 (hereafter referred to as a targeted pool 42 in the descriptions of FIG. 14) will be described as an example in the following. The corresponding pool 42 includes five real pages 52 of the page numbers "100", "101", "102", "103", and "104". The real pages 52 of the page numbers "100", "101", and "102" are the used real pages 52, and the real pages 52 of the page numbers "103" and "104" are the empty real pages 52.

The values of the queue pointers 628 to 62C related to the targeted pool 42 are described beside the queue pointers 628 to 62C that are included in the pool control information. Moreover, the values of the data characteristics 634 and the queue pointers 635 to 638 that are related to all the real pages 52 (the five real pages 52 of the page numbers "100", "101", "102", "103", and "104" in the example of FIG. 14) in the targeted pool 42 are described beside the data characteristics 634 and the queue pointers 635 to 638 that are included in the real page control information.

At first, the used real page queue pointer 628 that is included in the pool control information and the queue pointer 635 in a pool that is included in the real page control information will be described below. As described above, the used real page queue pointer 628 and the queue pointer 635 in a pool are the queue pointers that are used for controlling the used real page 52 in the corresponding pool 42. The value of the used real page queue pointer 628 is the number of a used real page 52 in the corresponding pool 42. That is, the used real page queue pointer 628 indicates a used real page 52 in the corresponding pool 42. In consideration of a real page 52 (the said real page 52), a value of the queue pointer 635 in a pool in the said real page 52 is the information ("root" in the example of FIG. 14) that indicates that there is not the page number of other used real page 52 or other used real page 52 in the case in which the said real page 52 is a used real page 52 (the information that indicates that there is not the page number of other empty real page 52 or other empty real page 52 in the case in which the said real page 52 is an empty real page 52). That is, the queue pointer 635 in a pool indicates other used real page 52 (or other empty real page). Here, other used (empty) real page 52 is a used (empty) real page 52 that is different from the said real page 52 and any of all the used (empty) real pages 52 indicated from the used (empty) real pages 52 that are indicated by the used real page queue pointer 628 (the empty real page queue pointer 629) to the said real page 52.

In the example of FIG. 14, the used real page queue pointer 628 indicates the used real page 52 of the page number "102". Moreover, the queue pointer 635 in a pool for the used real page 52 of the page number "102" indicates the used real page 52 of the page number "101". Moreover, the queue pointer 635 in a pool for the used real page 52 of the page number "101" indicates the used real page 52 of the page number "100".

As described above, the used real page queue pointer 628 and the queue pointer 635 in a pool connect all the used real pages 52 in the corresponding pool 42. Consequently, the CTL 31 that refers to the control information can know all the used real pages 52 in the corresponding pool 42 by tracing the used real page queue pointer 628 and the queue pointer 635 in a pool. The order of the used real pages 52 that are connected by the used real page queue pointer 628 and the queue pointer 635 in a pool can be arbitrarily specified.

As described above, the empty real page queue pointer 629 that is included in the pool control information and the queue pointer 635 in a pool that is included in the real page control information are the queue pointers that are used for controlling the empty real page 52 in the corresponding pool 42. A method for controlling the empty real page 52 using the empty real page queue pointer 629 and the queue pointer 635 in a pool is the same as a method for controlling the used real page 52 using the used real page queue pointer 628 and the queue pointer 635.

Next, the data created date and time queue pointers 62A and 636 will be explained in the following. As described above, the data created date and time queue pointers 62A and 636 are the queue pointers that are used for controlling the data created date and time for data that has been stored in each of all the used real pages 52 in the corresponding pool 42. A value of the data created date and time queue pointer 62A that is included in the pool control information is a page number of data that has the oldest data created date and time and that has been stored into the used real pages 52 in the corresponding pool 42. That is, the data created date and time queue pointer 62A that is included in the pool control information indicates the used real pages 52 into which the data having the oldest data created date and time has been stored. In consideration of a used real page 52 (the said used real page 52), a value of the data created date and time queue pointer 636 in the said used real page 52 is a page number of the used real page 52 having the data created date and time old next to the oldest one. Here, the used real page 52 having the data created date and time old next to the oldest one indicates the used real pages 52 into which the data having the data created date and time old next to data that has been stored into the said used real page 52 has been stored.

In the example of FIG. 14, the data created date and time queue pointer 62A indicates the used real page 52 of the page number "102". Moreover, the data created date and time queue pointer 636 for the used real page 52 of the page number "102" indicates the used real page 52 of the page number "101". Moreover, the data created date and time queue pointer 636 for the used real page 52 of the page number "101" indicates the used real page 52 of the page number "100".

As described above, the data created date and time queue pointers 62A and 636 connect all the used real pages 52 in the corresponding pool 42 in the order from the oldest created date and time of the data that is stored into the used real pages. Consequently, the CTL 31 that refers to the control information can obtain the used real pages 52 in the corresponding pool 42 in the order from the oldest created date and time of the data that is stored into the used real pages by tracing the data created date and time queue pointers 62A and 636. In addition to the data created date and time queue pointers 62A and 636 or in place of the data created date and time queue pointers 62A and 636, a queue pointer that connects all the used real pages 52 in the corresponding pool 42 in the order from the latest created date and time of the data that is stored into the used real pages can also be used.

For instance, in the case in which the data characteristics that are considered in the layer change rule are the data created date and time, the CTL 31 can effectively select the real page 52 to be judged by referring to the data created date and time queue pointers 62A and 636. Here, the real page 52 to be judged is a real page 52 into which the data in which the judgment whether the layer change is carried out or not (that is, the judgment whether the layer change rule is conformed to or not) will be performed has been stored. The effective selection of the real page 52 to be judged will be described below in detail with reference to FIG. 14. For instance, the layer change rule is that 365 days elapse from the data created date and time. In addition, the present date and time is "Sep. 1, 2020 01:23:45". At first, the CTL 31 refers to the data created date and time queue pointer 62A that is included in the pool control information. By this, the CTL 31 can obtain the used real page 52 into which the data that has the oldest data created date and time has been stored (the real page 52 of the page number "102" in the example of FIG. 14). The CTL 31 specifies the obtained used real page 52 as a first real page 52 to be judged. The data created date and time of the real page 52 of the page number "102" that is the first real page 52 to be judged is "Aug. 1, 2001 01:23:45". Consequently, at the present date and time is "Sep. 1, 2020 01:23:45", 365 days elapse from the data created date and time of "Aug. 1, 2001 01:23:45". That is, the data that has been stored into the first real page 52 to be judged (hereafter referred to as the first data to be judged in the descriptions of FIG. 14) conforms to the layer change rule. Therefore, a storage location of the first data to be judged is changed to other layer. Subsequently, the CTL 31 refers to the data created date and time queue pointer 636 in the first real page 52 to be judged. By this, the CTL 31 can obtain the used real page 52 into which the data that has the data created date and time old next to the first data to be judged has been stored (the real page 52 of the page number "101" in the example of FIG. 14). The CTL 31 specifies the obtained used real page 52 as a second real page 52 to be judged. The data created date and time of the real page 52 of the page number "101" that is the second real page 52 to be judged is "Aug. 2, 2002 01:23:45". Consequently, at the present date and time is "Sep. 1, 2020 01:23:45", 365 days do not elapse from the data created date and time of "Aug. 2, 2002 01:23:45". That is, the data that has been stored into the second real page 52 to be judged (hereafter referred to as the second data to be judged in the descriptions of FIG. 14) does not conform to the layer change rule. Therefore, a storage location of the second data to be judged is not changed to other layer. Here, for the real page 52 that is connected by the data created date and time queue pointer 636 after the second real page 52 to be judged, the data update date and time of the data that has been stored into the real page 52 is later than that of the second real page 52 to be judged. Consequently, the CTL 31 can judge that data that conforms to the layer change rule does not exist at this time except for the first data to be judged. That is, it is not necessary for the CTL 31 to judge whether the layer is changed or not for all of the data that is stored into each of all the real pages 52.

As described above, the final data update date and time queue pointers 62B and 637 are the queue pointers that are used for controlling the final data update date and time for data that has been stored in each of all the used real pages 52 in the corresponding pool 42. The final data access date and time queue pointers 62C and 638 are the queue pointers that are used for controlling the final data access date and time for data that has been stored in each of all the used real pages 52 in the corresponding pool 42. The manners of utilizing the queue pointers 62B, 637, 62C, and 638 are equivalent to the utilizing manners of the data created date and time queue pointers 62A and 636. More specifically, the final data update date and time queue pointers 62B and 637 connect all the used real pages 52 in the corresponding pool 42 in the order from the oldest final data update date and time of the data that is stored into the used real pages. Moreover, the final data access date and time queue pointers 62C and 638 connect all the used real pages 52 in the corresponding pool 42 in the order from the oldest final data access date and time of the data that is stored into the used real pages. Similarly to the data created date and time queue pointers 62A and 636, in addition to the final data update date and time queue pointers 62B and 637 or in place of the final data update date and time queue pointers 62B and 637, a queue pointer that connects all the used real pages 52 in the corresponding pool 42 in the order from the latest final data update date and time of the data that is stored into the used real pages can also be used. Moreover, in addition to the final data access date and time queue pointers 62C and 638 or in place of the final data access date and time queue pointers 62C and 638, a queue pointer that connects all the used real pages 52 in the corresponding pool 42 in the order from the latest final data access date and time of the data that is stored into the used real pages can also be used.

The processing that is carried out for the storage system 3 in accordance with the embodiment of the present invention will be described in detail in the following. In the following descriptions, the subject that carries out each processing is the CTL 31. However, each processing can also be carried out under the control of the host adapter 32 of the CTL 31, and can also be carried out under the control of the storage device adapter 36 of the CTL 31. Moreover, each processing are implemented by executing computer programs by the microprocessor in the CTL 31 (for instance, in the host adapter 32 and/or the storage device adapter 36). However, as substitute for that, at least a part of the computer programs can also be executed by a hardware circuit.

Figure 15:
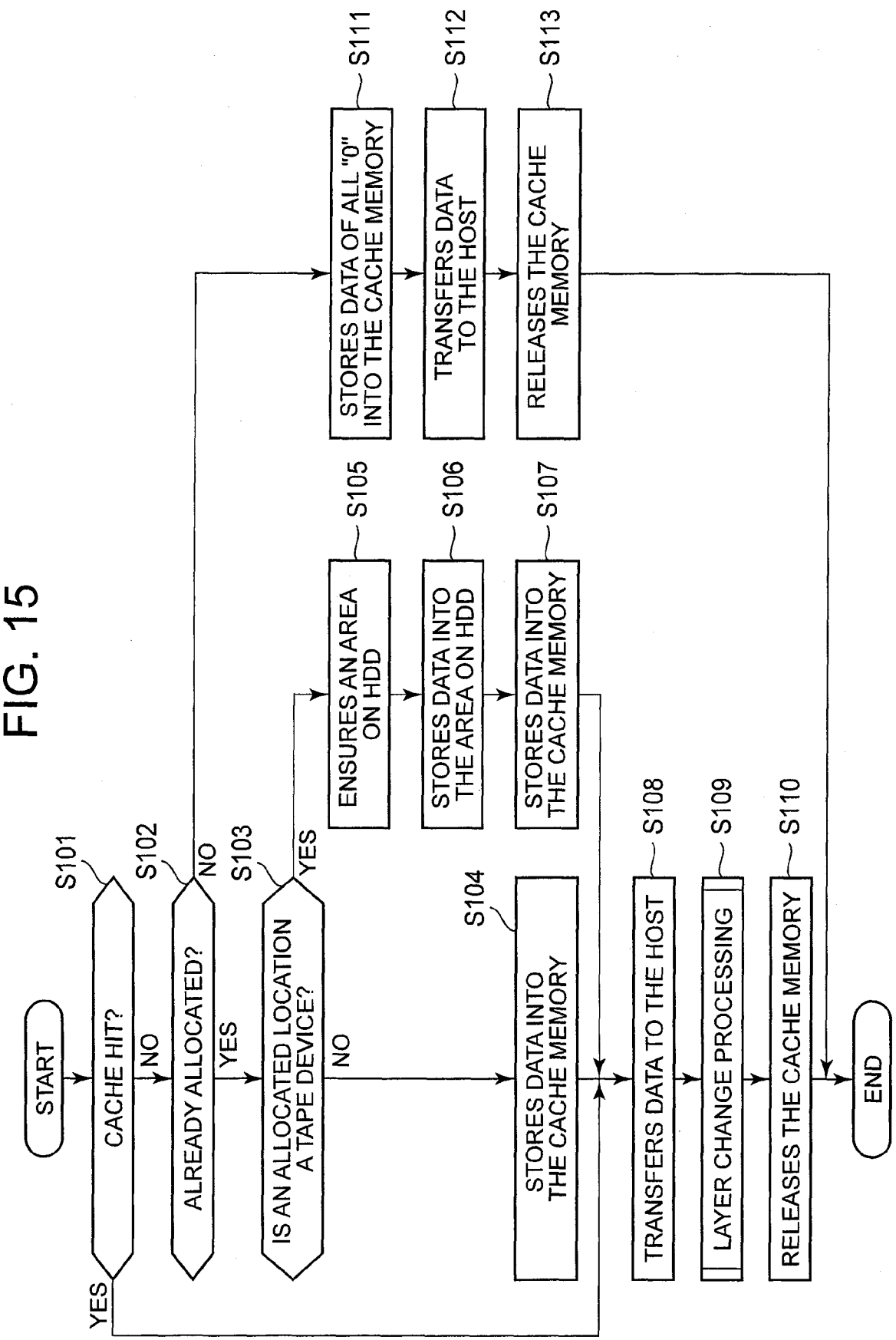
FIG. 15 is a flowchart of a processing that is carried out by CTL in the case in which a read request is received.

FIG. 15 is a flowchart of a processing that is carried out by the CTL 31 in the case in which a read request is received.

In the case in which the CTL 31 (the host adapter 32) receives a read request from the host 1, the processing shown in FIG. 15 is started. For the read request, the read targeted virtual VOL 41 and the LBA that indicates the virtual page 51 of a storage location of the read targeted data are specified.

At first, the CTL 31 that has received a read request judges whether the read targeted data has been stored into the cache memory 34 (S101).

In the case in which the read data has been stored into the cache memory 34 (S101: YES), the CTL 31 carries out the processing of S108.

On the other hand, in the case in which the read targeted data has not been stored into the cache memory 34 (S101: NO), the CTL 31 judges whether any of the real pages 52 is allocated to the virtual page 51 that is specified by the specified LBA (hereafter referred to as the targeted virtual page 51 in the descriptions of FIGS. 15 and 16) or not (S102). The judgment is carried out by referring to the virtual VOL control table 61. More specifically, in the case in which the information that indicates any of the real pages 52 has been stored into the real page of the allocating source corresponding to the targeted virtual page 51 for the virtual VOL control table 61, the CTL 31 judges the real page 52 is allocated. On the contrary, in the case in which the information that indicates any of the real pages 52 is not stored into the real page of the allocating source corresponding to the targeted virtual page 51 for the virtual VOL control table 61, the CTL 31 judges the real page 52 is not allocated.

In the case in which the real page 52 is not allocated to the targeted virtual page 51 (S102: NO), the CTL 31 stores data of all "0" into the cache memory 34 (S111).

After that, the CTL 31 transmits the data of all "0" that has been stored into the cache memory 34 to the host 1 as the read targeted data (S112).

After that, the CTL 31 releases the cache memory 34 (S113). More specifically, the CTL 31 deletes the data of all "0" that has been stored into the cache memory 34.

On the other hand, in the case in which the real page 52 is allocated to the targeted virtual page 51 (S102: YES), the CTL 31 judges whether the data storage location of the read targeted data is the tape device 37D or not (that is, whether the real page 52 that is allocated to the targeted virtual page 51 is in the tape pool 42D or not) (S103). More specifically, the CTL 31 refers to the virtual VOL control table 61, and in the case in which the pool type 614 of the real page of the allocating source corresponding to the targeted virtual page 51 for the virtual VOL control table 61 indicates the tape pool 42D, the CTL 31 judges that the data storage location of the read targeted data is the tape device 37D. On the contrary, in the case in which the pool type 614 of the real page of the allocating source corresponding to the targeted virtual page 51 for the virtual VOL control table 61 indicates other than the tape pool 42D, the CTL 31 judges that the data storage location of the read targeted data is not the tape device 37D.

In the case in which the data storage location of the read targeted data is not the tape device 37D (S103: NO), the CTL 31 reads the read targeted data from the storage device 37 that is a storage location of the read targeted data, and stores the data into the cache memory 34 (S104). After that, the CTL 31 carries out the processing of S108.

On the other hand, in the case in which the data storage location of the read targeted data is the tape device 37D (S103: YES), the CTL 31 ensures an area on the HDD for storing the read targeted data temporarily (S105).

After that, the CTL 31 reads the read targeted data from the storage device 37 (the tape device 37D) that is a storage location of the read targeted data, and stores the data into the area that has been ensured in S105 (S106).

After that, the CTL 31 reads the read targeted data from the area that has been ensured in S105, and stores the data into the cache memory 34 (S107).

In S108, the CTL 31 transmits the read targeted data that has been stored into the cache memory 34 to the host 1.

After that, the CTL 31 carries out the layer change processing using the real page 52 that has been allocated to the targeted virtual page 51 as the real page 52 to be judged (S109). The layer change processing that is carried out in S109 will be described later in detail with reference to FIG. 16.

After that, the CTL 31 releases the cache memory 34 (S110). More specifically, the CTL 31 deletes the read targeted data that has been stored into the cache memory 34.

Figure 16:
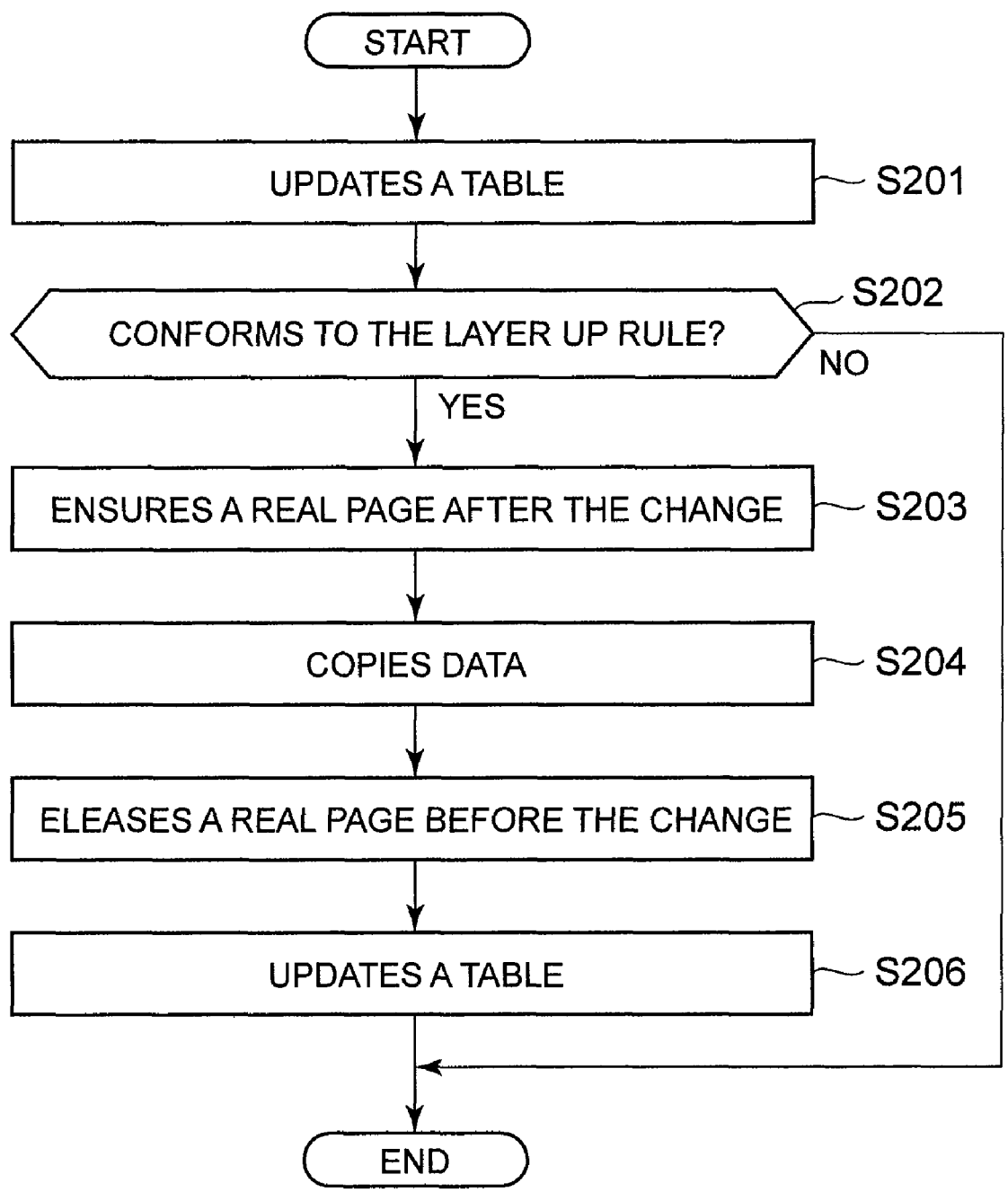
FIG. 16 is a flowchart of a layer change processing that is carried out in S109 of FIG. 15.

FIG. 16 is a flowchart of the layer change processing that is carried out in S109 of FIG. 15.

At first, the CTL 31 updates the contents of the pool control table 62 and the real page control table 63 (S201). That is, the CTL 31 updates the pool control information and the real page control information that are changed by the access to the read targeted data by the host 1 to the contents after the change. More specifically, at first, the CTL 31 updates the final data access date and time in the real page control information related to the real page 52 (the real page 52 to be judged) into which the read targeted data has been stored to the present date and time. Moreover, the CTL 31 adds "1" to the number of accesses in the real page control information related to the real page 52 to be judged. Furthermore, the CTL 31 changes a queue structure related to the final data access date and time in the pool 42 that includes the real page 52 to be judged (hereafter referred to as the targeted pool 42 in the descriptions of FIG. 16). That is, the CTL 31 changes the value of the final data access date and time queue pointer 62C in the pool control information related to the targeted pool 42 and the value of the final data access date and time queue pointer 638 in the real page control information related to the real page 52 included in the targeted pool 42 in such a manner that the real page 52 to be judged is connected to the final end of the queue structure.

After that, the CTL 31 judges whether the read targeted data conforms to the layer change rule or not (S202). The layer change processing shown in FIG. 16 is carried out in the case in which the number of accesses to the read targeted data is increased. Consequently, here, it is judged whether the layer up rule is conformed to or not. More specifically, the CTL 31 obtains the layer up rule related to the targeted pool 42 (the layer change rule 643 for the table 64) from the layer change rule table 64. Here, the obtained layer up rule is that the number of accesses exceeds 10000 times. Moreover, the CTL 31 obtains the number of accesses in the data characteristics 634 corresponding to the real page 52 to be judged (that is, the number of accesses related to the read targeted data) by referring to the real page control table 63. Furthermore, the CTL 31 judges whether the obtained number of accesses conforms to the obtained layer up rule or not (that is, whether the obtained number of accesses exceeds 10000 times or not).

In the case in which the read targeted data does not conform to the layer change rule (S202: NO), the CTL 31 completes the processing of FIG. 16. That is, in this case, the storage location of the read targeted data is not changed.

On the other hand, in the case in which the read targeted data conforms to the layer change rule (S202: YES), the CTL 31 carries out the processing of S203 to S206 to change the layer of the storage location of the read targeted data.

At first, the CTL 31 obtains the pool 42 after the change (the pool 42 after the change in the table 64) in the case in which the layer up rule that has been obtained in S202 is conformed to from the layer change rule table 64. The CTL 31 then selects the real page 52 that is included in the obtained pool 42 after the change and that is not allocated to any virtual page 51 (the real page 52 after the change). Subsequently, the CTL 31 ensures an area of the selected real page 52 after the change (S203). The number of the selected real pages 52 is different depending on a size of the virtual page 51, a size of the real page 52 of the targeted pool 42, and a size of the real page 52 of the pool 42 after the change. The detailed particulars were described in FIGS. 6 and 7.

At first, the CTL 31 copies the read targeted data from the real page 52 before the change (the real page 52 to be judged) to the real page 52 after the change (S204).

After that, the CTL 31 releases an area of the real page 52 before the change (the real page 52 to be judged) (S205). That is, the read targeted data that has been stored into the real page 52 to be judged is deleted. By S204 and S205, a migration of the read targeted data from the real page 52 to be judged to the real page 52 after the change is completed.

At first, the CTL 31 updates the contents of the virtual VOL control table 61, the pool control table 62, and the real page control table 63 (S206).

More specifically, the CTL 31 updates the virtual VOL control table 61 as follows. That is, the CTL 31 changes the contents of the real page of the allocating source corresponding to the targeted virtual page 51 for the virtual VOL control table 61 to the contents that indicates the real page 52 after the change. By this, the real page 52 that is allocated to the targeted virtual page 51 is changed from the real page 52 to be judged to the real page 52 after the change.

Since the storage location of the read targeted data is changed, the real page 52 to be judged is changed to the empty real page 52, and the real page 52 after the change is changed to the used real page 52. Then, the CTL 31 updates the pool control table 62 as follows. That is, the CTL 31 changes the used real page number 626 corresponding to the targeted pool 42 for the pool control table 62 to a value in which the number of the real pages 52 to be judged ("1" in this example) is subtracted from the original value. Moreover, the CTL 31 changes the empty real page number 626 corresponding to the targeted pool 42 for the pool control table 62 to a value in which the number of the real pages 52 to be judged ("1" in this example) is added to the original value. Furthermore, the CTL 31 changes the used real page number 626 corresponding to the pool 42 after the change for the pool control table 62 to a value in which the number of the real pages 52 to be judged ("1" in this example) is added to the original value. Furthermore, the CTL 31 changes the empty real page number 626 corresponding to the pool 42 after the change for the pool control table 62 to a value in which the number of the real pages 52 to be judged ("1" in this example) is subtracted from the original value.

The CTL 31 updates the real page control table 63 as follows. That is, the CTL 31 changes all the values of the virtual page 633 and the data characteristics 634 of the allocating source corresponding to the real page 52 to be judged for the real page control table 63 related to the corresponding pool 42 to "null" (data that indicates that none is set). Moreover, the CTL 31 changes the virtual page 633 of the allocating source corresponding to the real page 52 after the change for the real page control table 63 related to the pool 42 after the change to the contents that indicate the targeted virtual page 51. Furthermore, the CTL 31 sets each value to the data characteristics 634 corresponding to the real page 52 after the change for the real page control table 63 related to the pool 42 after the change. That is, the present date and time is set to the data created date and time, the final data update date and time, and the final data access date and time. In addition, the number of accesses is one.

Although the detailed descriptions are omitted, the values of queue pointers 628 to 62C corresponding to each of the targeted pool 42 and the pool 42 after the change for the pool control table 62 and the values of queue pointers 635 to 638 in the real page control table 63 related to each of the targeted pool 42 and the pool 42 after the change are also updated to the contents that indicate a queue structure after the change.

Figure 17:
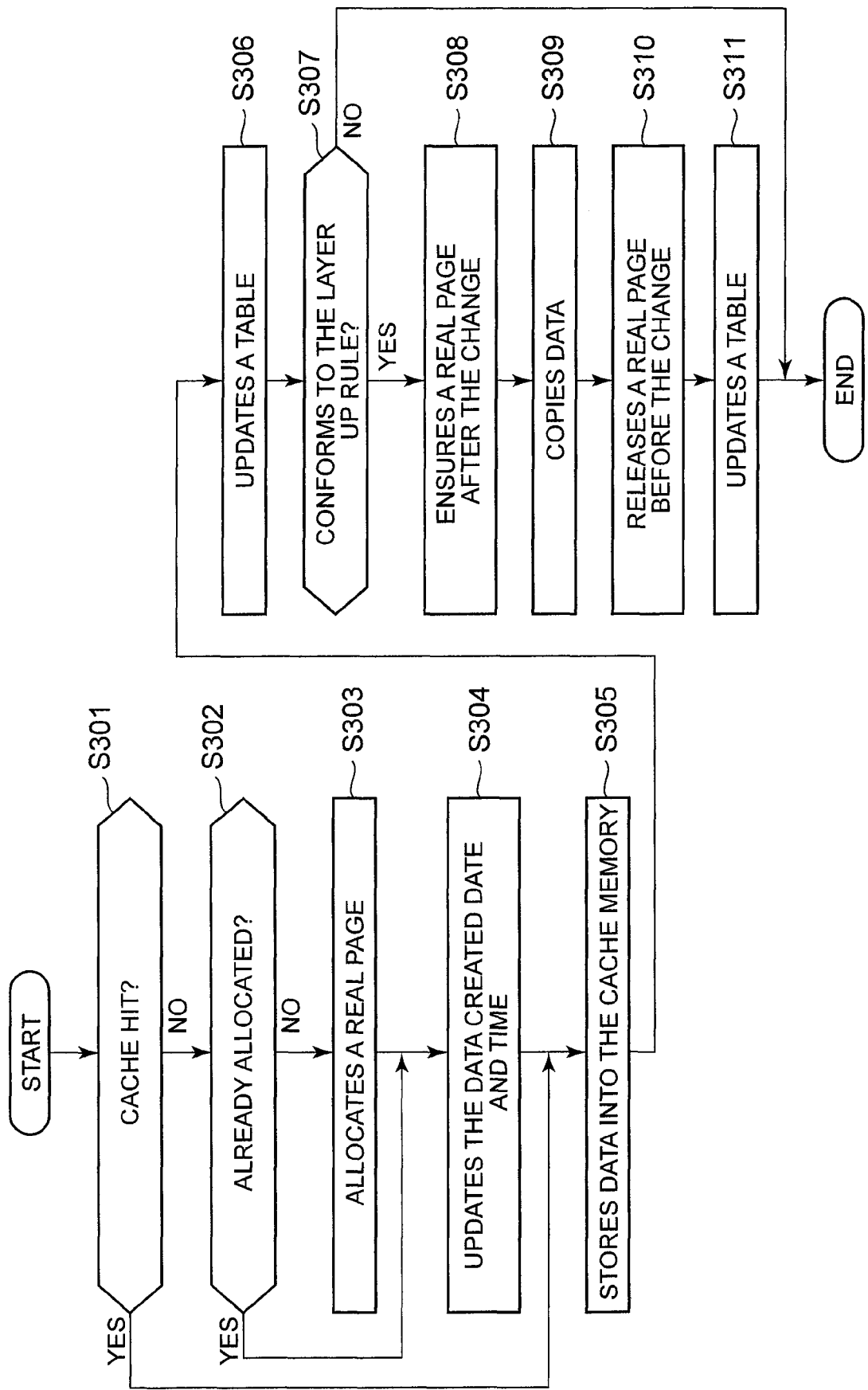
FIG. 17 is a flowchart of a processing that is carried out by CTL in the case in which a write request is received.

FIG. 17 is a flowchart of a processing that is carried out by the CTL 31 in the case in which a write request is received.

In the case in which the CTL 31 (the host adapter 32) receives a read request from the host 1, the processing shown in FIG. 17 is started. For the write request, the write targeted virtual VOL 41 and the LBA that indicates the virtual page 51 of a storage location of the write targeted data are specified.

At first, the CTL 31 that has received a write request judges whether an area corresponding to the real page 52 (hereafter referred to as the targeted real page 52 in the descriptions of FIG. 17) that is allocated to the virtual page 51 (hereafter referred to as the targeted virtual page 51 in the descriptions of FIG. 17) that is specified by the specified LBA is ensured on the cache memory 34 (S301).

In the case in which an area corresponding to the targeted real page 52 is ensured on the cache memory 34 (S301: YES), the CTL 31 carries out the processing of S305. In this case, the overwriting of data is carried out.

On the other hand, in the case in which an area corresponding to the targeted real page 52 is not ensured on the cache memory 34 (S301: NO), new data is written. The CTL 31 judges whether any of the real pages 52 is allocated to the targeted virtual page 51 or not (that is, the targeted virtual page 51 exists or not) (S302). The judgment is carried out similarly to S102 of FIG. 15.

In the case in which the real page 52 is allocated to the targeted virtual page 51 (S302: YES), the CTL 31 carries out the processing of S304.

On the other hand, in the case in which the real page 52 is not allocated to the targeted virtual page 51 (S302: NO), the CTL 31 allocates the real page 52 to the targeted virtual page 51 (S303). More specifically, for instance, the CTL 31 selects the real page 52 that is included in the initial pool 42 set in advance for the write targeted virtual VOL 41 and that is not allocated to any virtual page 51. Subsequently, the CTL 31 changes the real page of the allocating source corresponding to the targeted virtual page 51 for the virtual VOL control table 61 to the contents that indicates the selected real page 52. By this, the selected real page 52 becomes the targeted real page 52.

In S304, the CTL 31 updates the data created date and time related to the write targeted data in the real page control table 63. More specifically, the CTL 31 changes the data created date and time of the data characteristics 634 corresponding to the targeted virtual page 51 in the real page control table 63 to the present date and time.

In S305, the CTL 31 stores the write targeted data into an area on the cache memory 34 corresponding to the targeted real page 52. The write targeted data that has been stored into the area on the cache memory 34 is then stored into an area on the storage device 37 corresponding to the targeted real page 52.

After that, the CTL 31 carries out the processing of S306 to S311 (the layer change processing). The processing is substantially equivalent to the processing of S201 to S206 of FIG. 16. Here, the targeted real page 52 is the real page 52 to be judged. Moreover, the write targeted data is corresponded to the read targeted data in the descriptions of FIG. 16. Furthermore, in S306, the final data update date and time is also updated in addition to the final data access date and time and the number of accesses for the real page control information related to the real page 52 (the real page 52 to be judged) into which the write targeted data has been stored. Furthermore, for a queue structure, a queue structure related to the final data update date and time is also changed in addition to a queue structure related to the final data access date and time.

Figure 18:
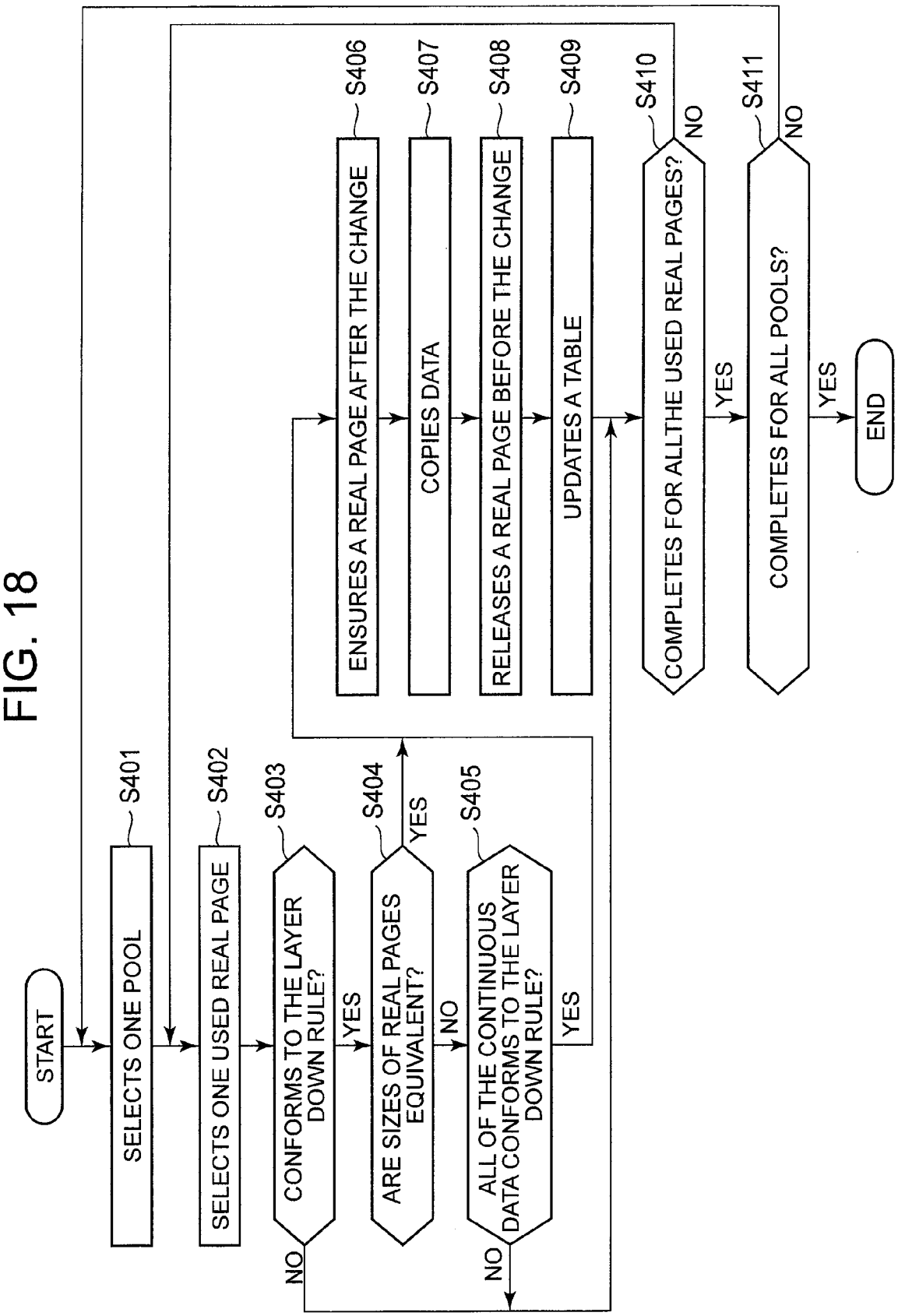
FIG. 18 is a flowchart of a layer change processing that is carried out regularly or irregularly.

FIG. 18 is a flowchart of a layer change processing that is carried out regularly or irregularly.

The processing of FIG. 18 is carried out regularly or irregularly. In the embodiment of the present invention, a change from the lower layer to the upper layer (layer up) is carried out in the processing of FIGS. 15 to 17 described above (that is, in the case in which an access to data is carried out), and a change from the upper layer to the lower layer (layer down) is carried out in the processing of FIG. 18. In the processing of FIG. 18, it can be judged whether the layer up rule is conformed to or not, and the layer up can be carried out.

At first, the CTL 31 selects one of the pools 42 that have been formed in the storage system 3 (S401). In the following, the pool 42 that is selected in S401 is called the selected pool 42.

Next, the CTL 31 selects one of the used real pages 52 in the selected pool 42 (S402). In the following, the used real page 52 that is selected in S402 is called the selected used real page 52.

After that, the CTL 31 judges whether the data that has been stored into the selected used real page 52 (hereafter referred to as the targeted data in the descriptions of FIG. 18) conforms to the layer change rule (the layer down rule in the embodiment of the present invention) or not (S403). More specifically, the CTL 31 obtains the layer down rule related to the selected pool 42 (the layer change rule 643 in the table 64) from the layer change rule table 64. In addition, the CTL 31 obtains the data characteristics 634 corresponding to the selected used real page 52 (that are considered in the obtained layer down rule) by referring to the real page control table 63. The CTL 31 then judges whether the obtained data characteristics conform to the obtained layer down rule or not.

In the case in which the targeted data does not conform to the layer down rule (S403: NO), the CTL 31 carries out the processing of S410.

On the other hand, in the case in which the targeted data conforms to the layer down rule (S403: YES), the CTL 31 obtains the pool 42 after the change in the case in which the layer down rule that has been obtained in S403 is conformed to (the pool 644 after the change in the table 64) from the layer change rule table 64. In addition, the CTL 31 obtains a size of a real page 52 in the selected pool 42 and a size of a real page 52 in the pool 42 after the change from the pool control table 62. The CTL 31 then judges whether a size of a real page 52 in the selected pool 42 and a size of a real page 52 in the pool 42 after the change are equivalent to each other or not (S404).

In the case in which a size of a real page 52 in the selected pool 42 and a size of a real page 52 in the pool 42 after the change are equivalent to each other (S404: YES), the CTL 31 carries out the processing of S406 to S409 to change a layer of a storage location of the targeted data.

On the other hand, in the case in which a size of a real page 52 in the selected pool 42 and a size of a real page 52 in the pool 42 after the change are different from each other (S404: NO), a size of a real page 52 in the pool 42 after the change is larger than a size of a real page 52 in the selected pool 42. This is because the pool 42 after the change in the case in which the layer down rule is conformed to is included in the lower layer of the layer in which the pool 42 before the change (the selected pool 42) is included. Consequently, in this case, the CTL 31 judges whether at least one data that is continuous to the targeted data and that have a size equivalent to that of the targeted data (hereafter the data is referred to as the continuous data in the descriptions of FIG. 18) in addition to the targeted data conforms to the layer down rule obtained in S403 or not (S405). The number of the continuous data is different depending on a size of a real page 52 in the selected pool 42 and a size of a real page 52 in the pool 42 after the change. The detailed particulars were described in FIGS. 8 and 9.

In the case in which any of the continuous data does not conform to the layer down rule obtained in S403 (S405: NO), the CTL 31 carries out the processing of S410.

On the other hand, in the case in which all of the continuous data conforms to the layer down rule obtained in S403 (S405:

YES), the CTL 31 carries out the processing of S406 to S409 to change a layer of a storage location of the targeted data.

More specifically, at first, the CTL 31 selects the real page 52 that is included in the pool 42 after the change obtained in S404 and that is not allocated to any virtual page 51 (the real page 52 after the change). Subsequently, the CTL 31 ensures an area of the selected real page 52 after the change (S406).

At first, the CTL 31 copies the read targeted data from the real page 52 before the change (the selected used real page 52) to the real page 52 after the change (S407).

After that, the CTL 31 releases an area of the real page 52 before the change (the selected used real page 52) (S408). That is, the targeted data that has been stored into the selected used real page 52 is deleted. By S407 and S408, a migration of the read targeted data from the selected used real page 52 to the real page 52 after the change is completed.

At first, the CTL 31 updates the contents of the virtual VOL control table 61, the pool control table 62, and the real page control table 63 (S409). The detailed processing is substantially equivalent to the processing of S206.

The CTL 31 repeats the execution of the processing of S402 to S409 for all the used real pages 52 in the selected pool 42 (S410). As described above, the CTL 31 can select the used real page 52 in the order from the oldest final data update date and time or the oldest final data access date and time by referring to the queue pointers 62B, 62C, 637, and 638. Consequently, when the used real page 52 into which the data that does not conform to the layer down rule has been stored is found, it is found that the data that has been stored into the real page 52 that is selected after the time point does not conform to the layer down rule. In this case, it is not necessary to carry out the processing of S402 to S409 for all the used real pages 52 in the selected pool 42.

The CTL 31 repeats the execution of the processing of S401 to S410 for all the pools 42 that are formed in the storage system 3 (S411).

FIG. 19 is a view for showing an example of a window in which the CLT 31 makes a user to set the information related to the pool 42.

As shown in FIG. 19, for instance, the window 7 is provided with an area 71 for inputting a pool ID of the pool 42 to be specified, a radio button 72 for selecting a page size of the real page 52 in the pool 42 to be specified, an area 73 for setting a real area that is registered to the pool 42 to be specified, and an area 74 for setting the layer change rule related to the pool 42 to be specified.

Figure 20:
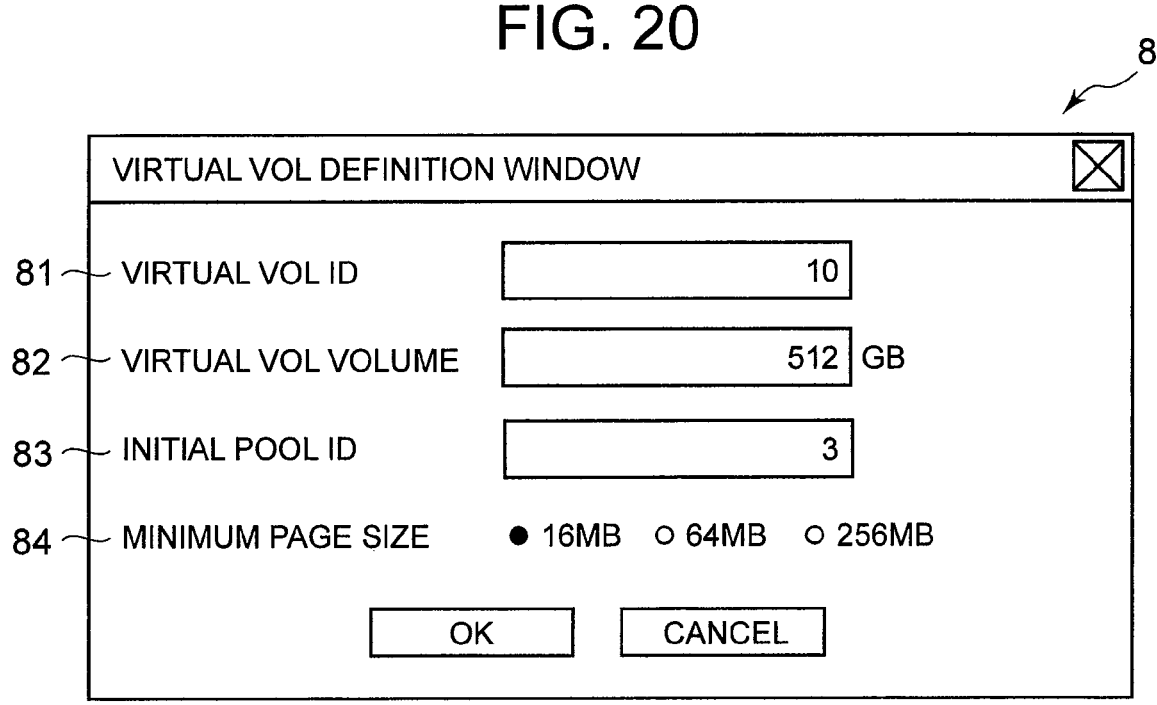
FIG. 20 is a view for showing an example of a window in which CLT makes a user to set the information related to a virtual VOL.

FIG. 20 is a view for showing an example of a window in which the CLT 31 makes a user to set the information related to the virtual VOL 41.

As shown in FIG. 20, for instance, the window 8 is provided with an area 81 for inputting a virtual VOL ID of the virtual VOL 41 to be specified, an area 82 for inputting a volume of the virtual VOL 41 to be specified, an area 83 for inputting a pool ID of the initial pool 42 that has been specified in advance for the virtual VOL 41 to be specified, and a radio button 84 for selecting a minimum page size of the virtual page 51 that configures the virtual VOL 41 to be specified.

Figure 21:
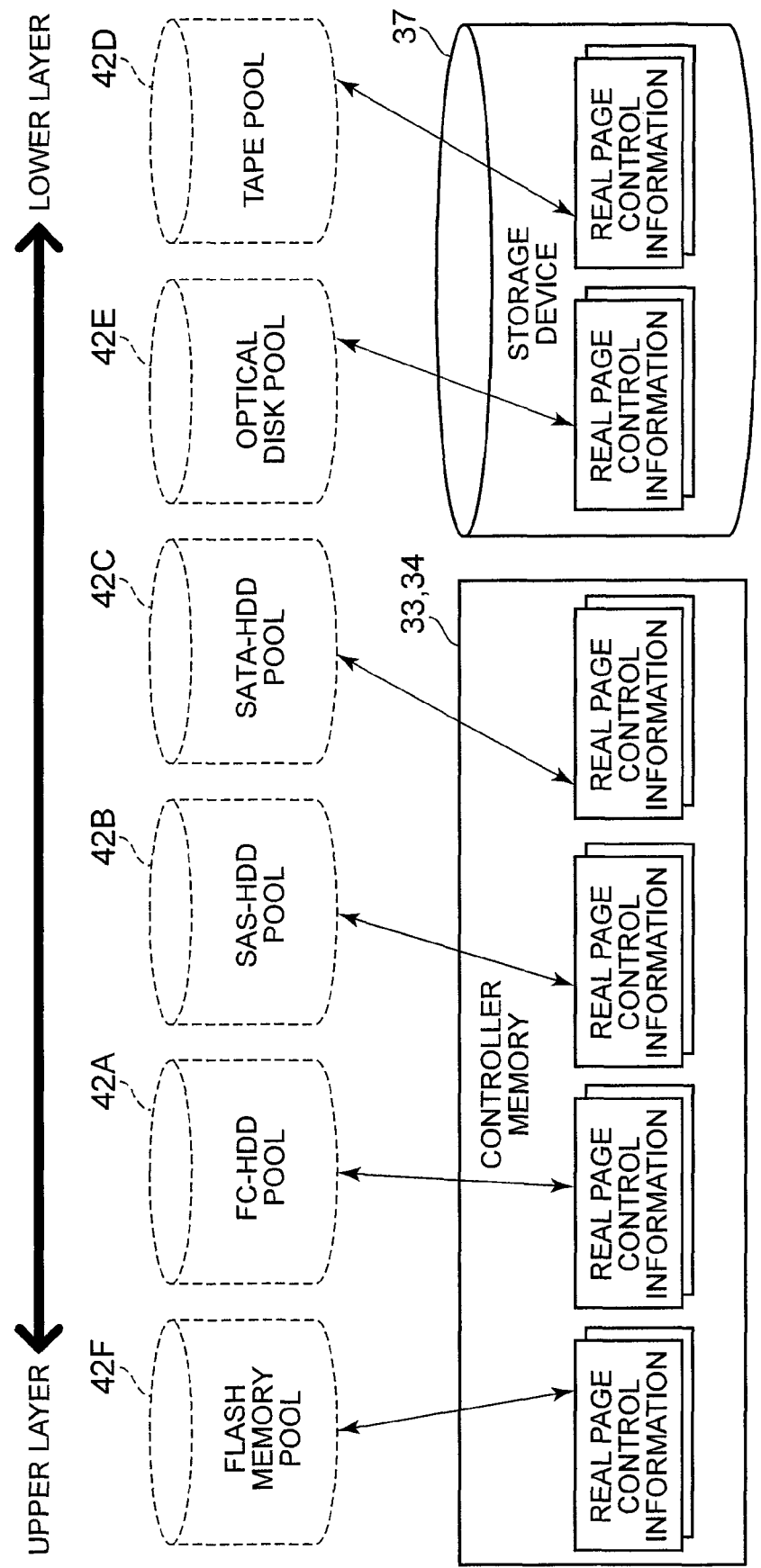
FIG. 21 is a view for showing an example of a control method of the real page control information.

FIG. 21 is a view for showing an example of a control method of the real page control information.

The real page control information is stored into at least one of the cache memory 34 and/or the shared memory 33 (hereafter collectively referred to as a controller memory) and the storage device 37. In FIG. 21, the real page control information corresponding to each real page in the pool of a type included in a layer equivalent to or higher than the specified level is stored into the controller memory, and the real page control information corresponding to each real page in the pool of a type included in a layer lower than the specified level is stored into the storage device 37. The storage device 37 can be a storage device that is a basis of a pool of any type.

The above described embodiments in accordance with the present invention are examples for describing the present invention, and the scope of the present invention is not restricted to the embodiments. The various changes, modifications, and functional additions can be thus made without departing from the scope of the present invention.

What is claimed is:

1. A storage system comprising:
a plurality of storage devices that are the basis of pools of a plurality of types; and
a controller that receives an I/O request that is a write request or a read request from a host computer and that performs an I/O processing that follows the I/O request,
wherein the plurality of storage devices includes storage devices of a plurality of types having different performances,
wherein the pools of a plurality of types are included in different layers, based on at least one storage device of the same type, pools of types corresponding to the type are configured, and
wherein the pool of each type is configured by a plurality of real pages based on at least one storage device of the same type that is the basis of a pool,
wherein the controller further comprises:
an I/O processing section that allocates a real page that has not been allocated in a pool of any one type to a virtual page and that writes write targeted data that follows the received I/O request that is a write request to the allocated real page when the I/O processing section receives a write request in which a virtual page in a virtual volume that is a virtual logical volume composed of a plurality of virtual pages is specified from the host computer, if the real page has not been allocated to the specified virtual page as the I/O processing; and
a storage location change processing section that performs storage location change processing in which a storage location of targeted data that has been stored to a targeted first real page allocated to a virtual page is changed to a second real page that has not been allocated in a pool of a second type different from a pool of a first type including the targeted first real page when the storage location change processing section conforms to prescribed storage location change conditions,
wherein each virtual page is a virtual storage area,
wherein each real page is a physical storage area, and
wherein a size of a real page is different depending on a type of a pool.

2. The storage system as defined in claim 1,
wherein a size of a real page in a pool of a type included in a lower layer is larger than a size of a real page in a pool of a type included in a higher layer,
wherein a size of the real page in the pool of each type is N times of a size of a virtual page (N is a natural number),
wherein the controller is provided with a memory,
wherein the memory stores data characteristics information related to the data characteristics of data that has been stored to a real page allocated to the virtual page and change condition information that indicates a type of a pool to which a data storage location is changed when the type of a pool conforms to a storage location change condition, wherein the storage location change processing section performs the following (2-1) and (2-2) as the storage location change processing:

(2-1) determining whether the data characteristics of the targeted data conform to the storage location change condition corresponding to the pool of the first type with reference to the change condition information; and (2-2) migrating from the targeted first real page to a second real page that is specified by the change condition information and that is not allocated in the pool of a second type that is a storage location corresponding to the pool of the first type when the result of the determination of step (2-1) is positive, wherein the storage location change processing section performs the following (A-1) to (A-3) when a size of the first real page is P times of a size of the second real page (P is a natural number of at least 2) since a layer that includes the pool of the first type is lower than a layer that includes the pool of the second type in step (2-1):

(A-1) selecting the P second real pages that have not been allocated from the pool of the second type, and migrating the P targeted data parts that configure the targeted data to the P selected second real pages;

(A-2) cancelling an allocation of the targeted first real page to at least one targeted virtual page that is an allocated location of the targeted first real page; and (A-3) allocating the P second real pages to the at least one targeted virtual page in such a manner that a continuity of the targeted data can be maintained, and the storage location change processing section performs the determination of step (2-1) for the data characteristics of data that has been stored to the (Q-1) first real pages that have been allocated to a targeted virtual page other than the at least one targeted virtual page in a plurality of targeted virtual pages including the at least one targeted virtual page that is an allocated location of the targeted first real page, and performs the following (B-1) to (B-3) as step (2-2) for all of data that has been stored to the (Q-1) first real pages when the result of the determination of step (2-1) is positive when a size of the second real page is Q times of a size of the first real page (Q is a natural number of at least 2) since a layer that includes the pool of the first type is higher than a layer that includes the pool of the second type in step (2-1):

(B-1) selecting the second real page that has not been allocated from the pool of the second type, and migrating all of data that has been stored to the Q first real pages to the selected second real page;

(B-2) cancelling an allocation of the Q first real pages to the plurality of targeted virtual pages; and (B-3) allocating the second real page selected in step (B-1) to the plurality of targeted virtual pages.

3. The storage system as defined in claim 2, wherein real page control information that includes the information related to the real page is prepared for every real page in the pool of each type, wherein the memory stores the real page control information corresponding to each real page in the pool of a type included in a layer equivalent to or higher than a specified level, and wherein any one of the plurality of storage devices stores the real page control information corresponding to each real page in the pool of a type included in a layer lower than the specified level.

4. The storage system as defined in claim 3, wherein the storage location change processing section performs the storage location change processing regularly and after the I/O processing section performs an I/O processing that follows the I/O request in which the virtual volume is specified.

5. The storage system as defined in claim 1, wherein the controller is provided with a storage resource, wherein the storage resource stores data characteristics information that indicates the data characteristics of data that has been stored to a real page for each of the real page allocated to the virtual page that configures the virtual volume and the change condition information that indicates a type of a pool to which a data storage location is changed when the type of a pool conforms to a storage location change condition, and wherein the storage location change processing comprises steps of:

(5-1) determining whether the data characteristics of the targeted data conform to the storage location change condition corresponding to a type of the pool of the first type; and (5-2) migrating the targeted data from the first real page to the second real page when the result of the determination is positive.

6. The storage system as defined in claim 5, wherein the storage location change processing section selects second real pages (P is an integer number of at least 2), and migrates the P targeted data parts that configure the targeted data to the P second real pages in step (5-2) when a size of the first real page is larger than a size of the second real page, and wherein the value of P is based on a relationship between a size of the first real page and a size of the second real page.

7. The storage system as defined in claim 5, wherein the storage location change processing section judges whether or not the data characteristics conform to the storage location change condition corresponding to the pool of the first type for each of at least one data that has been stored to at least one other first real page that has been allocated to each of at least one virtual page continuous to the targeted virtual page in addition to the targeted data in step (5-1) when a size of the first real page is smaller than a size of the second real page, and wherein the storage location change processing section migrates the first data and the at least one data to the second real page in step (5-2) when the result of the determination for the targeted data and the result of the determination for the at least one data are all positive.

8. The storage system as defined in claim 5, wherein a size of a real page that is registered to a pool is set to larger while a performance of a type of the pool is lower.

9. The storage system as defined in claim 5, wherein the I/O processing section updates the data characteristics information related to data that has been stored to the targeted real page after an I/O processing is carried out to the targeted real page that is a real page allocated to the specified virtual page, and wherein the storage location change processing section performs step (5-1) for the data that has been stored to the targeted real page.

10. The storage system as defined in claim 5, wherein the access performances of the storage devices of a plurality of types are different from each other, wherein the access performances of the pools of a plurality of types are different from each other corresponding to each of types of the storage devices, the data characteristics information is a final data access date and time that is the date and time in which data is accessed at last, wherein the storage location change condition is that the first data is not accessed from the present date and time for the prescribed period or more, wherein the access performance of the second pool is lower than the access performance of the first pool, and wherein the storage location change processing section judges whether or not the targeted data is accessed for the prescribed period or more from the final data access date and time to the present date and time in step (5-1), and migrates the targeted data from the first real page to the second real page in step (5-2) when the targeted data is not accessed for the prescribed period or more from the final data access date and time to the present date and time.

11. The storage system as defined in claim 10, wherein the storage location change processing section repeats the execution of the storage location change processing for each of the plurality of targeted real pages using one selected from the plurality of targeted real pages that are registered to the targeted pool selected from the plurality of pools and that are allocated to the virtual page as the first real page, wherein the data characteristics information controls the plurality of targeted real pages in the order from the oldest final data access date and time related to the data that has been stored to each of the plurality of targeted real pages, and wherein the storage location change processing section selects the first real page from the plurality of targeted real pages according to the order of the data characteristics information to carry out the storage location change processing, completes the storage location change processing at the point when the first data does not conform to the prescribed condition, and does not carry out the storage location change processing for a targeted real page that has not been selected.

12. The storage system as defined in claim 1, wherein real page control information that includes the information related to the real page is prepared for every real page in the pool of each type, wherein the controller is provided with a memory, wherein the memory stores the real page control information corresponding to each real page in the pool of a type included in a layer equivalent to or higher than the specified level, and wherein any one of the plurality of storage devices stores the real page control information corresponding to each real page in the pool of a type included in a layer lower than the specified level.

* * * * *